US011241871B2

(12) United States Patent
Spahn et al.

(10) Patent No.: US 11,241,871 B2
(45) Date of Patent: Feb. 8, 2022

(54) LAMINATED CAN END STOCK WITH ELEVATED TEMPERATURE ANNEALING

(71) Applicant: Novelis Inc., Atlanta, GA (US)

(72) Inventors: Peter Spahn, Göttingen (DE); Heinrich Prinzhorn, Göttingen (DE); Nicolas C. Kamp, Uslar (DE); Dhiren Bhupatlal Ruparelia, Göttingen (DE)

(73) Assignee: Novelis Inc., Atlanta, GA (US)

( * ) Notice: Subject to any disclaimer, the term of this patent is extended or adjusted under 35 U.S.C. 154(b) by 699 days.

(21) Appl. No.: 15/588,022

(22) Filed: May 5, 2017

(65) Prior Publication Data

US 2017/0326862 A1 Nov. 16, 2017

Related U.S. Application Data

(60) Provisional application No. 62/334,198, filed on May 10, 2016.

(51) Int. Cl.
*B32B 41/00* (2006.01)
*B32B 37/10* (2006.01)
(Continued)

(52) U.S. Cl.
CPC .............. *B32B 37/10* (2013.01); *B32B 7/08* (2013.01); *B32B 7/12* (2013.01); *B32B 15/08* (2013.01);
(Continued)

(58) Field of Classification Search
CPC ..... B32B 37/10; B32B 15/08; B32B 37/0053; B32B 27/18; B32B 7/12; B32B 27/36;
(Continued)

(56) References Cited

U.S. PATENT DOCUMENTS 4,812,183 A * 3/1989 Sanders, Jr. ............. B05D 7/14
148/439
5,093,208 A 3/1992 Middleton et al.
(Continued)

FOREIGN PATENT DOCUMENTS

CN 1030296 11/1995
CN 1123537 5/1996
(Continued)

OTHER PUBLICATIONS

Anna Rudawska (Dec. 16, 2015). Adhesive Properties of Metals and Metal Alloys, Surface Energy, Mahmood Aliofkhazraei, IntechOpen, DOI: 10.5772/60599. Available from: https://www.intechopen.com/books/surface-energy/adhesive-properties-of-metals-and-metal-alloys (Year: 2015).*

(Continued)

*Primary Examiner* — Michael N Orlando
*Assistant Examiner* — Joshel Rivera
(74) *Attorney, Agent, or Firm* — Kilpatrick Townsend & Stockton LLP

(57) ABSTRACT

Improved aluminum can end stock (CES) is disclosed. The CES includes a laminated, amorphous polymer coating exhibiting low feathering, low blushing, and high performance in an acetic acid test. The laminated metal strip can include the laminated polymer coating on an interior-facing side and a lacquered coating on an exterior-facing side. The CES is formed by performing an annealing process on the laminated metal strip, wherein the metal strip is raised to an annealing temperature above the melting point of the polymer for a sufficient duration to render the polymer amorphous. In some cases, the polymer film laminated to the metal strip is a Polyethylene terephthalate (PET) film.

32 Claims, 13 Drawing Sheets

(51) Int. Cl.

| | | |
|---|---|---|
| *B65D 17/28* | (2006.01) | |
| *B32B 37/04* | (2006.01) | |
| *B32B 7/08* | (2019.01) | |
| *B32B 27/36* | (2006.01) | |
| *B32B 7/12* | (2006.01) | |
| *B32B 27/18* | (2006.01) | |
| *B32B 37/00* | (2006.01) | |
| *B32B 15/08* | (2006.01) | |
| *B32B 15/09* | (2006.01) | |
| *B32B 15/20* | (2006.01) | |
| *B65D 1/16* | (2006.01) | |
| *C22F 1/047* | (2006.01) | |
| *C23C 22/77* | (2006.01) | |
| *C23F 17/00* | (2006.01) | |

(52) U.S. Cl.
CPC ............. *B32B 15/09* (2013.01); *B32B 15/20* (2013.01); *B32B 27/18* (2013.01); *B32B 27/36* (2013.01); *B32B 37/0053* (2013.01); *B32B 37/04* (2013.01); *B65D 1/165* (2013.01); *B65D 17/4012* (2018.01); *C22F 1/047* (2013.01); *C23C 22/77* (2013.01); *C23F 17/00* (2013.01); *B32B 2307/518* (2013.01); *B32B 2307/538* (2013.01); *B32B 2307/714* (2013.01); *B32B 2307/732* (2013.01); *B32B 2309/02* (2013.01); *B32B 2311/24* (2013.01); *B32B 2367/00* (2013.01); *B32B 2439/66* (2013.01); *B32B 2439/70* (2013.01)

(58) Field of Classification Search
CPC ........... B32B 7/08; B32B 37/04; B32B 15/20; B32B 15/09; B32B 2307/538; B32B 2307/732; B32B 2439/66; B32B 2309/02; B32B 2307/518; B32B 2439/70; B32B 2367/00; B32B 2311/24; B32B 2307/714; B32B 2038/0048; B32B 2255/06; B32B 3/14; B65D 17/4012; B65D 1/165; C23F 17/00; C23C 22/77; C22F 1/047
USPC .................... 156/60, 64, 350, 351, 378, 379
See application file for complete search history.

(56) References Cited

U.S. PATENT DOCUMENTS

| | | | |
|---|---|---|---|
| 5,103,550 | A | 4/1992 | Wefers et al. |
| 5,318,648 | A | 6/1994 | Heyes et al. |
| 5,582,319 | A | 12/1996 | Heyes et al. |
| 7,942,991 | B1 | 5/2011 | Loen et al. |
| 2003/0198751 | A1 | 10/2003 | Larsen et al. |
| 2016/0257099 | A1 | 9/2016 | Nakamaru et al. |
| 2017/0088965 | A1* | 3/2017 | Murata .................... C25D 5/34 |

FOREIGN PATENT DOCUMENTS

| | | | | |
|---|---|---|---|---|
| CN | 1181029 | | 5/1998 | |
| EP | 0312304 | B1 | 3/1993 | |
| EP | 1086808 | A2 | 3/2001 | |
| JP | H04201237 | A | 7/1992 | |
| JP | H091734 | A | 1/1997 | |
| JP | H09263923 | A | 10/1997 | |
| JP | 2001009968 | | 1/2001 | |
| JP | 2001121648 | A | 5/2001 | |
| JP | 2002120002 | | 4/2002 | |
| JP | 2002210865 | | 7/2002 | |
| JP | 2004122577 | A | 4/2004 | |
| JP | 2006321237 | A | 11/2006 | |
| JP | 2008296439 | A | 12/2008 | |
| JP | 2014159125 | A | 9/2014 | |
| RU | 2149102 | C1 | 5/2000 | |
| WO | 0153004 | A2 | 7/2001 | |
| WO | 2015068720 | A1 | 5/2015 | |
| WO | WO-2015133499 | A1 * | 9/2015 | ............... C25D 3/38 |

OTHER PUBLICATIONS

International Patent Application No. PCT/US2017/031289, Invitation to Pay Additional Fees and Partial Search Report dated Jul. 26, 2017, 6 pages.
International Patent Application No. PCT/US2017/031289, International Search Report and Written Opinion dated Sep. 19, 2017, 16 pages.
Office Action issued in Russian Patent Application No. 2018143305 dated Jun. 14, 2019, along with an English translation (6 pages).
Australian Pat. Appl. No. 2017264579, "First Examination Report", dated Jul. 30, 2019, 4 pages.
Australian Pat. Appl. No. 2017264579, "Second Examination Report", dated Dec. 24, 2019, 5 pages.
Canadian Pat. Appl. No. 3,023,495, "Office Action", dated Nov. 13, 2019, 5 pages.
Indian Pat. Appl. No. 201817041991, "First Examination Report", dated Dec. 26, 2019, 6 pages.
Japanese Pat. Appl. No. 2018-559291, "Office Action", dated Nov. 19, 2019, 6 pages.
Korean Pat. Appl. No. 10-2018-7035226, "Office Action", dated Jan. 21, 2020, 15 pages.
Russian Pat. Appl. No. 2018143305, "Office Action", dated Sep. 16, 2019, 10 pages.
Canadian Application No. 3,023,495, Office Action, dated Sep. 16, 2020, 5 pages.
Chinese Application No. 201780028978.0, Office Action, dated Jun. 30, 2020, 26 pages.
Japanese Application No. 2018-559291, Office Action, dated Jul. 21, 2020, 6 pages.
Korean Application No. 10-2018-7035226, Office Action, dated Jul. 29, 2020, 10 pages.
Chinese Application No. 201780028978.0, Office Action, dated Mar. 9, 2021, 19 pages.
Japanese Application No. 2018-559291, Office Action, dated Mar. 2, 2021, 5 pages.
Korean Application No. 10-2018-7035226, Office Action, dated Feb. 20, 2021, 4 pages.
Brazilian Application No. 112018071907-2, Office Action, dated Jul. 13, 2021, 7 pages.
Chinese Application No. 201780028978.0, Office Action, dated Jul. 2, 2021, 18 pages.
Japanese Application No. 2018-559291, Office Action, dated Aug. 31, 2021, 8 pages.
Canadian Application No. 3,023,495, Office Action, dated May 3, 2021, 4 pages.
European Application No. 17727972.6, Office Action, dated May 21, 2021, 3 pages.
Korean Application No. 10-2018-7035226, Office Action, dated Apr. 23, 2021, 7 pages.

* cited by examiner

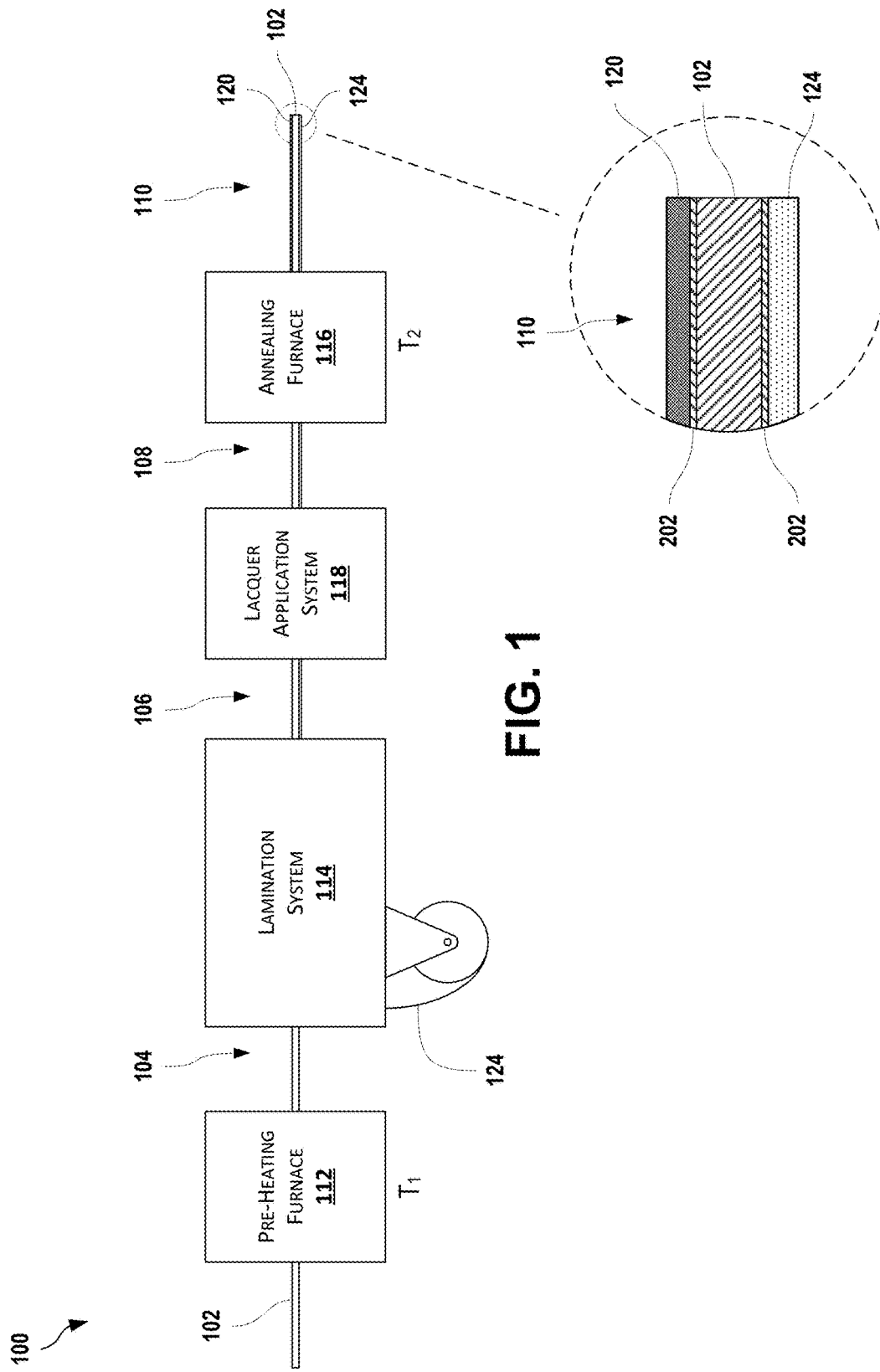

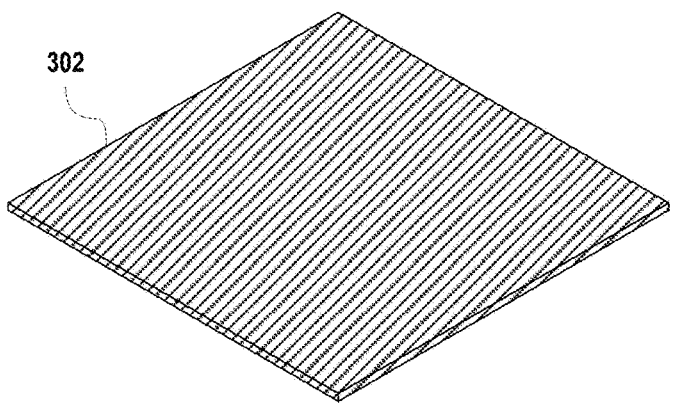
FIG. 3A
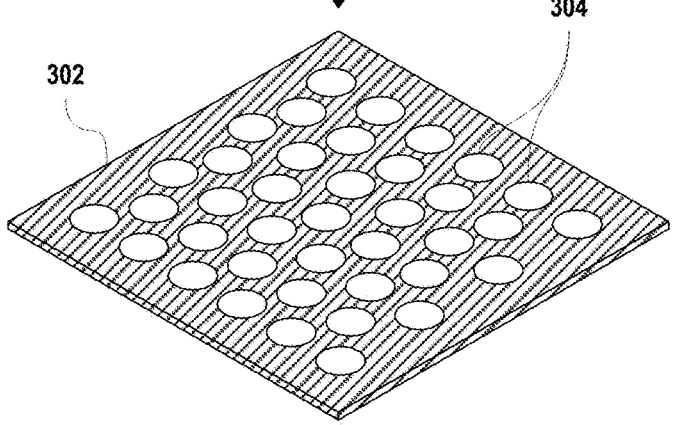
FIG. 3B
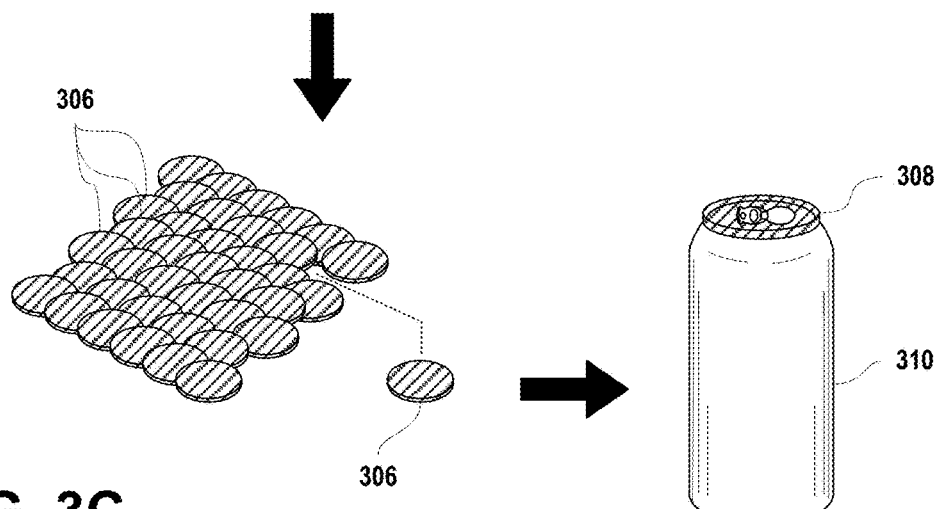
FIG. 3C
FIG. 3D

LAMINATED CAN END STOCK WITH ELEVATED TEMPERATURE ANNEALING

TECHNICAL FIELD

The present disclosure relates to metalworking generally and more specifically to laminating and pretreating metal strips.

BACKGROUND

Certain metal products, such as aluminum beverage cans, may require a protective layer, such as a polymer coating, between the metal and its contents. For example, beverage cans often must provide sufficient protection between the metal of the beverage can and the beverage contained therein to avoid damage to the metal from harsh beverages, such as sodas and colas, as well as to avoid undesirable effects to the beverage, such as discoloration or change in taste.

There are often requirements placed on the protective layer with regard to its fundamental properties. It can be desirable to produce a laminated metal product that meets various requirements. In some cases, it can be desirable to laminate a metal product rather than lacquer a metal product.

For example, certain can end stock (CES) used in beverage cans must have a protective layer that has less than a maximum amount of feathering and less than a maximum amount of blushing. Feathering can refer to the elongation and delamination of the protective layer, especially at breaks in the metal, such as the orifice created when opening a beverage can. Blushing can refer to the discoloration of the protective layer, such discoloration may occur when the coated metal is subjected to elevated temperature in a particular media, for example during a pasteurization or sterilization process. It can be desirable to have no discoloration during the pasteurization process. In some cases, the protective layer must withstand acid tests, such as an acetic acid test. The coated metal strip may need to conform to one or more of these and other requirements.

To ensure metal sheets laminated with polymers meet the desired requirements, it has been asserted that certain limitations must be placed on the choice of material and treatment processes pre-forming. These limitations can include restriction on polymer choice, tight temperature regulation with small windows for error, and other such restrictions.

U.S. Pat. No. 5,582,319 describes a process for producing polymer film coated metal sheet, stating that the use of amorphous polymer is undesirable because it is too elastic and would create too much feathering upon can opening and because it is too prone to blushing due to a crystallization mechanism of the polymer during pasteurization for example. The described process involves maintaining the annealing process temperature below the melting point of the main polymer layer to achieve compliance with CES requirements such as feathering and blushing after pasteurization. Additionally, the Aluminum alloy disclosed in the '319 patent has a low range of Mg content, falling outside of the standard industry alloy for AA5182, which in turn has an influence on the product properties.

It can be desirable to provide a laminated metal product capable of meeting or exceeding desired requirements. It can be desirable to create this laminated metal product using amorphous polymer.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include methods for preparing can end stock, comprising: pre-heating a metal strip to a first temperature below 250° C.; laminating a polymer film to a first side of the metal strip to produce a laminated metal strip, wherein a main component of the polymer film has a melting temperature above the first temperature; and annealing the laminated metal strip at an annealing temperature, wherein the annealing temperature is higher than the melting temperature of the polymer film.

In some cases, the metal strip is an aluminum strip, such as AA5182 aluminum alloy. In some cases, the method can include applying a conversion coating to the metal strip, wherein laminating the polymer film to the first side of the metal strip includes laminating the polymer film to the conversion coating. In some cases, laminating the polymer film includes laminating a polyethylene terephthalate film to the metal strip. In some cases, the method includes applying a layer of lacquer or another polymer film to a second side of the metal strip, wherein the first side of the metal strip corresponds to an interior-facing side of a can end formed from the metal strip, and wherein the second side of the metal strip corresponds an exterior-facing side of a can end formed from the metal strip. In some cases, annealing the laminated metal strip includes raising the temperature of the polymer film for a duration sufficient to melt the polymer film into a surface texture of the metal strip. In some cases, annealing the laminated metal strip includes raising the temperature of the polymer film to at least 250° C. In some cases, annealing the laminated metal strip includes raising the temperature of the polymer film to at least 265° C. In some cases, annealing the laminated metal strip includes raising the temperature of the polymer film to at least 280° C. In some cases, the method can include cooling the laminated metal strip after annealing the laminated metal strip to ensure that the polymer film remains amorphous. In some cases, the method can include applying a lubricant to the laminated metal strip after annealing the laminated metal strip. In some cases, the method can include selecting a conversion layer parameter from a plurality of conversion layer parameter candidates based on tested performance and applying a conversion layer to the metal strip, according to the conversion layer parameter, prior to laminating the polymer film to the first side of the metal strip. In some cases, the tested performance is blushing performance.

Embodiments of the present disclosure include methods for determining a conversion layer parameter comprising: determining a plurality of conversion layer parameter candidates; preparing, for each of the plurality of conversion layer parameter candidates, a can end stock sample according to the aforementioned methods; evaluating blushing performance for each of the can end stock samples; and selecting a conversion layer parameter from the plurality of conversion layer parameter candidates based on the evaluated blushing performance.

In some cases, the methods can include adjusting a surface roughness of the metal strip prior to laminating the polymer film to the first side of the metal strip. In some cases, adjusting the surface roughness includes decreasing a height of the surface roughness to a value lower than a thickness of a contact layer of the polymer film. In some cases, laminating the polymer film to the first side of the metal strip includes: compressing the polymer film against the first side of the metal strip using an applicator roller having a compressible layer surrounding a hollow metal core; and passing a fluid through the hollow metal core to control a temperature of the compressible layer. In some cases, the methods can include preheating the compressible layer prior to laminating the polymer film to the first side of the metal strip. In some cases, passing the fluid through the hollow metal core includes cooling the fluid to extract heat from an interior surface of the compressible layer to induce a thermal gradient between the interior surface of the compressible layer and an exterior surface of the compressible layer. In some cases, cooling the fluid includes reducing a temperature of the fluid sufficiently to maintain an interior temperature at the interior surface of the compressible layer below a maximum setpoint and an exterior temperature at the exterior surface of the compressible layer above a minimum setpoint. In some cases, the methods can include determining a temperature of the compressible layer; and adjusting a temperature or volumetric flow rate of the fluid based on the temperature of the compressible layer.

Embodiments of the present disclosure include can end stock products prepared according to the aforementioned methods. Embodiments of the present disclosure include a beverage can comprising a body piece and an end cap, wherein the end cap is formed from can end stock prepared according to the aforementioned methods.

Embodiments of the present disclosure include a system, comprising: a pre-heating furnace for accepting a metal strip and pre-heating the metal strip to a pre-heating temperature; a lamination system positioned downstream of the pre-heating furnace for accepting the metal strip at the pre-heating temperature and applying a polymer film to a first side of the metal strip, wherein the pre-heating temperature is below a melting temperature of a main component of the polymer film; and an annealing furnace positioned downstream of the lamination system for accepting a laminated metal strip and heating the laminated metal strip to an annealing temperature, wherein the annealing temperature is greater than the melting temperature of the main component of the polymer film.

In some cases, the metal strip is an aluminum strip, such as AA5182 aluminum alloy. In some cases, the system includes a conversion coating application system for applying a conversion coating to the metal strip, wherein the lamination system is configured to apply the polymer film to the conversion coating. In some cases, the lamination system is coupled to a supply of polyethylene terephthalate film. In some cases, the system includes a lacquer application system for applying a layer of lacquer to a second side of the metal strip. In some cases, the lamination system is configured to apply an additional polymer film to a second side of the metal strip opposite the first side. In some cases, the annealing furnace has a length sufficient to raise the temperature of the polymer film for a duration sufficient to melt the polymer film into a surface texture of the metal strip. In some cases, the annealing furnace is configured to provide heat sufficient to raise the temperature of the polymer film to at least 250° C. In some cases, the annealing furnace is configured to provide heat sufficient to raise the temperature of the polymer film to at least 265° C. In some cases, the annealing furnace is configured to provide heat sufficient to raise the temperature of the polymer film to at least 280° C. In some cases, the system includes a conversion layer applicator for applying a conversion layer to the metal strip according to a conversion layer parameter selected from a plurality of conversion layer parameter candidates based on tested performance. In some cases, the system includes a surface roughness adjustor for adjusting a surface roughness of the metal strip, wherein the surface roughness adjustor is located upstream of the lamination system. In some cases, the surface roughness adjustor is configured to decrease a height of the surface roughness to a value lower than a thickness of a contact layer of the polymer film. In some cases, the lamination system comprises: an applicator roller comprising a compressible layer surrounding a hollow metal core; and a coolant source for providing coolant to a passage of the hollow metal core to control a temperature of the compressible layer. In some cases, the system includes an external heater positioned adjacent the compressible layer to preheat the compressible layer. In some cases, the lamination system further comprises a controller coupled to the coolant source for adjusting a volumetric flow rate or temperature of the coolant provided by the coolant source to maintain a temperature gradient across an interior surface of the compressible layer and an exterior surface of the compressible layer. In some cases, the lamination system further comprises a temperature sensor coupled to the controller for providing a temperature signal associated with a temperature of the compressible layer. In some cases, the lamination system further comprises a data store containing a model, and wherein the controller is coupled to the data store to control the coolant source based on the model. In some cases, the lamination system further comprises a controller coupled to the coolant source for adjusting a volumetric flow rate or temperature of the coolant provided by the coolant source to maintain an interior temperature of an interior surface of the compressible layer below a maximum setpoint and an exterior temperature of an exterior surface of the compressible layer above a minimum setpoint.

Embodiments of the present disclosure include methods for laminating metal, comprising: compressing a polymer film against a first side of a preheated metal strip using an applicator roller having a compressible layer surrounding a hollow metal core; and passing a fluid through the hollow metal core to control a temperature of the compressible layer. In some cases, the methods include preheating the compressible layer prior to laminating the polymer film to the first side of the metal strip. In some cases, preheating the compressible layer includes passing heated fluid through the hollow metal core. In some cases, preheating the compressible layer includes externally heating the compressible layer. In some cases, passing the fluid through the hollow metal core includes cooling the fluid to extract heat from an interior surface of the compressible layer to induce a thermal gradient between the interior surface of the compressible layer and an exterior surface of the compressible layer. In some cases, cooling the fluid includes reducing a temperature of the fluid sufficiently to maintain an interior temperature at the interior surface of the compressible layer below a maximum setpoint and an exterior temperature at the exterior surface of the compressible layer above a minimum setpoint. In some cases, the methods include determining a temperature of the compressible layer; and adjusting a temperature or volumetric flow rate of the fluid based on the temperature of the compressible layer. In some cases, wherein determining the temperature of the compressible layer comprises receiving a temperature measurement of the compressible layer from a temperature sensor. In some cases, determining the temperature of the compressible layer comprises receiving a temperature measurement of an element near the compressible layer from a temperature sensor. In some cases, determining the temperature of the compressible layer comprises accessing a model. In some cases, the methods include sensing a change in line speed of the preheated metal strip; and adjusting a temperature or volumetric flow rate of the fluid based on the change in line speed.

BRIEF DESCRIPTION OF THE DRAWINGS

The specification makes reference to the following appended figures, in which use of like reference numerals in different figures is intended to illustrate like or analogous components.

FIG. 1 is a schematic diagram of a system for preparing can end stock (CES) according to certain aspects of the present disclosure.

FIG. 2 is a close-up side view of the can end stock of FIG. 1.

FIG. 3A is a sheet of can end stock according to certain aspects of the present disclosure.

FIG. 3B depicts the sheet of can end stock of FIG. 3A after being cut according to certain aspects of the present disclosure.

FIG. 3C depicts a set of can end blanks produced from the sheet of can end stock of FIG. 3A according to certain aspects of the present disclosure.

FIG. 3D depicts a beverage can including a can end formed from a can end blank from FIG. 3C according to certain aspects of the present disclosure.

DETAILED DESCRIPTION

Figure 4:
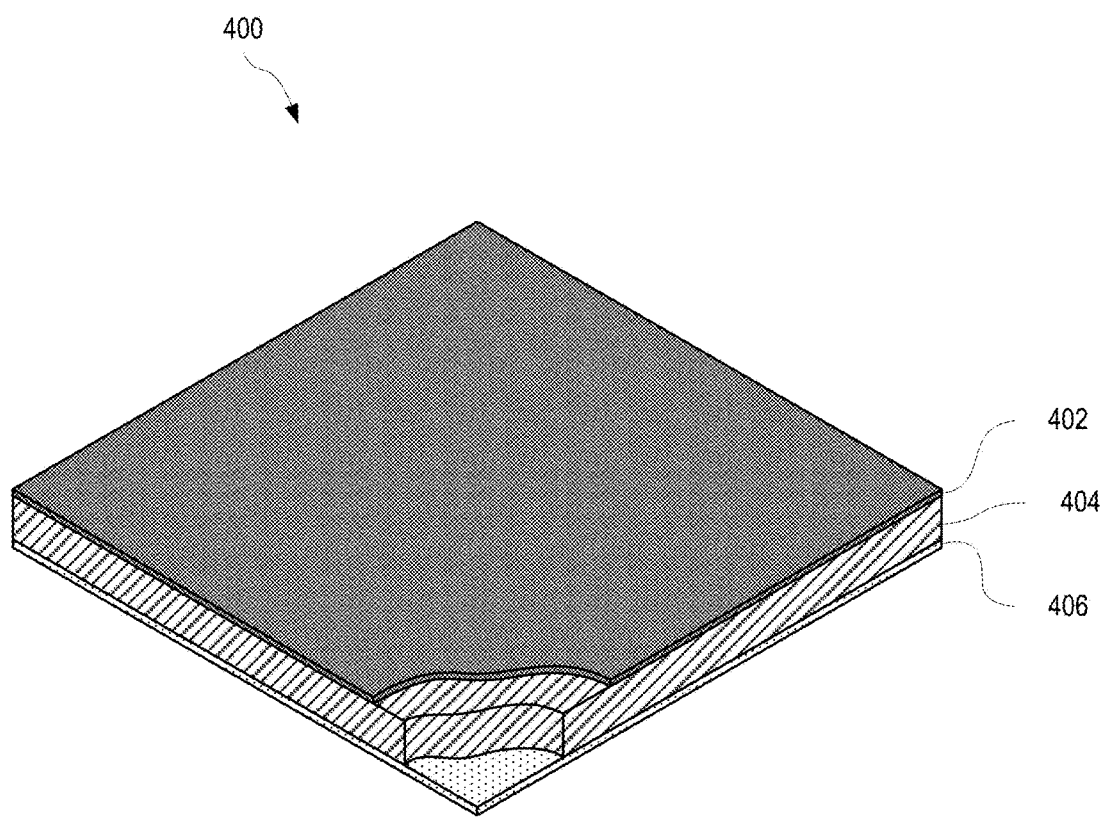
FIG. 4 is an isometric cutaway diagram depicting the multiple layers of a section of can end stock according to certain aspects of the present disclosure.

Certain aspects and features of the present disclosure relate to aluminum can end stock (CES) with a laminated, amorphous polymer coating exhibiting low feathering, low blushing and high performance in an acetic acid test. The laminated metal strip can include the laminated polymer coating on an interior-facing side (e.g., product side) and a lacquered coating on an exterior-facing side (e.g., consumer side). The process can include heating the bare metal strip to a temperature below the melting point of the main polymer component of the polymer film, applying the crystalline polymer to an interior-facing side of the strip, and heating the combined strip and polymer to an annealing temperature above the melting point of the polymer. In some cases, the polymer film laminated to the metal strip can be a biaxially oriented polymer, such as an amorphous Polyethylene terephthalate (PET) film from a continuous production line. The polymer film may be rendered amorphous during an annealing process. The polymer film can comprise only a main component (e.g., PET layer), or can comprise a main component and one or more supplemental components (e.g., adhesive layers). As used herein, the melting temperature of the polymer or polymer film refers to the melting temperature of the main component, unless otherwise specified.

Through significant trial and experimentation, techniques have been found to produce laminated can end stock having low feathering (e.g., 0.8 mm or less overhanging coating around a scoreline on open ends as defined by the specific customer specification), low blushing, and high performance in an acetic acid test. These techniques can include applying a polymer to a metal strip heated to a first temperature ($T_1$) before heating the combined strip and polymer to an annealing temperature ($T_2$), wherein $T_1$ is below the melting temperature ($T_m$) of the polymer and $T_2$ is above $T_m$. In some cases, $T_2$ is at or above 250° C., 255° C., 257° C., 260° C., 265° C., 270° C., 275° C., or 280° C. In some cases, the annealing that occurs at a temperature higher than the melting temperature of the polymer can improve the adhesion sufficiently to provide increased performance in an acid resistance test. During annealing at temperatures above the melting point of the film, the film is allowed to flow into the topography of the metal strip, thus improving adhesion between the metal strip and the film through mechanical bonding.

In some cases where the film possess a given color or greyness, blushing performance after pasteurization is not impaired by the amorphous state of the polymer after processing at a temperature $T_2$.

In some cases, a metal strip can be laminated on two sides. In some cases, a metal strip can be laminated on one side and lacquered on an opposite side. For example, a metal strip can be laminated on an interior-facing side and lacquered on an exterior-facing side, although other configurations can be used. This hybrid laminated/lacquered metal strip can provide improved functional performance on the interior of the can end stock through use of the PET laminate while maintaining high cosmetic performance on the exterior of the can end stock through use of a lacquer, which may not be prone to blushing, such as during pasteurization. In some cases, the PET film can include additives that provide a slight coloration to the film which does not change during pasteurization.

In some cases, the laminated metal stock is passed directly from a lamination process into an annealing process (e.g., into an annealing furnace). In some cases, the laminated metal stock is passed directly from a lamination process into a lacquer application system and then into an annealing process (e.g., into an annealing furnace).

Through trial and experimentation, it has been found that amorphous film can provide improved feathering performance when adhesion between the film and metal strip can be controlled. Trial and experimentation has shown that adhesion can be controlled by controlling the annealing temperature (e.g., higher annealing temperatures can lead to improved adhesion, to a point), controlling substrate properties (e.g., textures and chemistry), and film chemistry.

Traditional laminated metal strip often scored poorly on a 3% acetic acid test. However, through trial and experimentation, it was found that laminates annealed at a temperature above the melting point of the polymer would perform better on a 3% acetic acid test. As used herein, a 3% acetic acid test can include assessing the resistance of a coating against diluted acidic media at approximately 100° C. for 30 minutes. The test can include cutting crosshatched markings into samples and placing the samples into a 3% acetic acid solution at approximately 100° C. for 30 minutes, after which the samples are removed and cooled down, after which an additional set of cross cuts are performed on each sample and adhesive tape is placed over the pre- and post-acid bath crosshatched regions and removing the tape steadily in 0.5 to 1 second at an angle of approximately 60°. The results of the test (e.g., based on the presence of and intensity of delamination) can be used to determine if the metal strip is acceptable or unacceptable given the desired specifications. In some cases, the annealed, laminated can end stock disclosed herein passes 3% acetic acid tests without delamination. In some cases, the annealed, laminated can end stock disclosed herein obtain more favorable results in the 3% acetic acid tests (e.g., no or low delamination) than a standard, lacquered can end stock.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

In some cases, the aspects and features of the present disclosure are especially useful with aluminum AA5182, although other types of aluminum can be used.

FIG. 1 is a schematic diagram of a system 100 for preparing can end stock (CES) according to certain aspects of the present disclosure. A metal strip 102 is passed into a pre-heating furnace 112 that heats the metal strip 102 to a pre-heating temperature ($T_1$). The pre-heating temperature $T_1$ is well below the melting temperature of the polymer film 124 that will be laminated to the metal strip 102. In some cases, the pre-heating temperature $T_1$ is at or below 250° C., 240° C., 220° C., 200° C., 190° C., 180° C., 170° C., and 150° C. In some cases, the pre-heating temperature $T_1$ is within a range of 120° C. and 250° C., within a range of 170° C. and 240° C., or 190° C. and 220° C. The pre-heated metal strip 104 can pass into a lamination system 114. The metal strip 102, as a pre-heated metal strip 104, is passed through a lamination system 114 that applies a polymer film 124 to one side of the metal strip 102. In some cases, polymer film can be applied to both sides of the metal strip 102. The lamination system 114 can be any suitable system for laminating a polymer film 124 to the metal strip 102. A laminated metal strip 106 exits the lamination system 114, combining the metal strip 102 with a polymer film 124.

In some cases, the laminated metal strip 106 can pass into a lacquer application system 118. Lacquer 120 is applied to the metal strip 102 by the lacquer application system 118. The lacquer application system 118 can be any suitable system for applying lacquer 120 to the metal strip 102. A lacquer application system 118 can include an oven for heating or curing the lacquer 120 onto the metal strip 102. In some cases, the lacquer application system 118 is downstream of (e.g., after) the lamination system 114. In some cases, the lacquer application system 118 is upstream of (e.g., before) the annealing furnace 116. In some cases, the lacquer application system 118 is upstream of the lamination system 114 or the pre-heating furnace 112. In some cases, the lacquer application system 118 is downstream of both the lamination system 114 and the annealing furnace 116. As shown in FIG. 1, the lacquer application system 118 is located between the lamination system 114 and the annealing furnace 116. A laminated, lacquered metal strip 108 can exit the lacquer application system 118.

When an upstream lacquer application system 118 is used, laminated, lacquered metal strip 108 can pass into an annealing furnace 116. In some cases, where no lacquer application system 118 is used between the lamination system 114 and the annealing furnace 116, laminated metal strip 106 can pass into the annealing furnace.

The annealing furnace 116 can be positioned downstream of (e.g., after) the lamination system 114 and optionally the lacquer application system 118. In some cases, the annealing furnace 116 is positioned immediately downstream of the lacquer application system 118, such that the lacquered, laminated metal strip 108 exiting the lacquer application system 118 passes into the annealing furnace 116 before passing or coming into contact with other machinery or systems.

The annealing furnace 116 raises the temperature of the lacquered, laminated metal strip 108 to an annealing temperature ($T_2$). The annealing temperature $T_2$ is higher than the melting temperature ($T_m$) of the polymer film 124. In some cases, $T_2$ is at or above 250° C., 255° C., 257° C., 260° C., 265° C., 270° C., 275° C., or 280° C. Therefore, during the annealing process, the polymer film 124 is able to flow into the mechanical features (e.g., surface textures) of the metal strip 102 and becomes amorphous. The lacquered, laminated metal strip 108 spends a duration in the annealing furnace 116 of sufficient length to impart the desired properties on the lacquered, laminated metal strip 108, including annealing of the metal strip 102 and desired adhesion of the polymer film 124. The duration within the annealing furnace 116 can be based on furnace length and the speed of the metal strip. In some cases, the duration can be within the range of approximately 2 seconds to approximately 30 seconds, approximately 9 seconds to approximately 15 seconds, approximately 10 seconds to approximately 14 seconds, or approximately 12 seconds. In some cases, the duration can be adjusted (e.g., by adjusting the metal strip speed) as necessary to compensate for changes in the temperature within the annealing furnace 116.

After exiting the annealing furnace 116, the can end stock 110 (e.g., annealed, lacquered and laminated metal strip) can optionally be quenched, such as in a volume of quenching liquid or through application of coolant to the can end stock 110. The can end stock 110 can be cooled immediately after exiting the annealing furnace 116, through quenching or otherwise, at a rate sufficient to avoid substantial recrystallization of the amorphous polymer. In some cases, the can end stock 110 is cooled to below approximately 150° C. within a desired duration of approximately 30 seconds, 25 seconds, 20 seconds, 15 seconds, 10 seconds, 5 seconds, or 2 seconds or less. In some cases, the can end stock 110 is cooled to below approximately 150° C. within a duration of approximately 2 to 15 seconds. Avoiding substantial recrystallization can avoid blushing of the polymer. It can be desirable to have a weight fraction at or below 30%, 25%, 20%, or 15% of the recrystallizable part of the polymer being recrystallized. It can further be desirable for crystals formed to be at or below approximately 100 nm.

In some cases, the can end stock 110 produced by system 100 can include a metal strip 102 to which a layer of lacquer 120 has been applied to a first side and to which a layer of laminated polymer film 124 has been applied to a second side, as shown in FIGS. 1 and 2. The metal strip 102 of the can end stock 110 can be annealed and can include an crystalline polymer film 124 laminated thereto prior to being heated to a temperature above the melting temperature of the polymer film 124 for a sufficient duration to allow the polymer film 124 to melt into the surface texture of the metal strip 102 and become amorphous. As used herein, the duration sufficient to allow the polymer film 124 to melt into the surface texture of the metal strip 102 can be assessed by the polymer film 124 sufficiently adhering to the metal strip 102 to result after pasteurization in overhanging coating around a scoreline on open ends of 0.8 mm or less, 0.7 mm or less, 0.6 mm or less, or 0.5 mm or less.

As described herein, a standard feathering test for a can end may include immersing a can end in a bath of deionized water at approximately 75° C. for thirty minutes, rinsing the can end in cool deionized water to return the can end to room temperature, and then immediately opening the end tab of the can end. Feathering can be observed and measured on the scored panel or pour hole opening. In some cases, a feathering test can be conducted on a flat sheet of metal, such as a flat sheet of can end stock. In such cases, the feathering test can include immersing the sample in demineralized water at 80° C. for forty minutes, after which the sample is allowed to cool down to room temperature and the sample can be cut and a strip of metal can be separated by pulling the strip in a direction away from the cut. Other feathering tests can be used.

In some examples, a laminated metal strip annealed at a temperature of 280° C. provided a mean amount of feathering of 0.41 mm with a standard deviation of 0.28, whereas a laminated metal strip annealed at a temperature of 265° C. provided a mean amount of feathering of 1.08 mm with a standard deviation of 0.69. Through experimentation, it has been shown that improvement in feathering and delamination can be substantial at temperatures at or above the metaling temperature of the polymer film, such as at or above 250° C. This amount of feathering may be located at certain indicative positions along the orifice of the opened can end. Through experimentation, it has been shown that the amount of feathering of the film also depends on the cutting, forming and stamping tool design of the product.

In some cases, the metal strip 102 can include one or more conversion layers, as described in further detail below, pre-applied prior to entering the pre-heating furnace 112 or the lamination system 114.

In some cases, a lubricant can be further applied to the can end stock 110 after exiting the annealing furnace 116.

FIG. 2 is a close-up side view of the can end stock 110 of FIG. 1. The can end stock 110 includes metal strip 102 sandwiched between a layer of lacquer 120 and a laminated polymer film 124.

In some cases, to prepare the aluminum to provide enhanced adhesion and blushing performance, one or more conversion layers 202 may be applied on bare aluminum. In some cases, this layer 202 can include components of chromium(III) and phosphates. This layer 202 can provide enhanced adhesion, low blushing after pasteurization, and good corrosion performance in the acetic acid test. In some cases, the metal strip 102 can include one or more conversion layers 202 located between one or both of the layer of lacquer 120 and laminated polymer film 124. Characteristics of the conversion layers 202 can be selected to provide optimal blushing after pasteurization, as described in further detail with respect to FIG. 9.

FIGS. 3A-3D are axonometric depictions of can end stock 302 in various stages of production. In some cases, the can end stock 302 is the can end stock as described herein, including laminated amorphous polymer and lacquer as described herein.

FIG. 3A is a sheet of can end stock 302 according to certain aspects of the present disclosure. The sheet of can end stock 302 can be can end stock 110 depicted in FIG. 1, or a similar can end stock. FIG. 3B depicts the sheet of can end stock 302 of FIG. 3A after it is cut. The sheet of can end stock 302 can be die cut, punched, or otherwise cut to produce can end blanks 306 as seen in FIG. 3C. FIG. 3C depicts a set of can end blanks 306 produced from the sheet of can end stock of FIG. 3A. FIG. 3D depicts a beverage can 310 including a can end 308 formed from a can end blank 306 from FIG. 3C.

The can end 308 includes an exterior-facing side (e.g., visible in FIG. 3D) and an interior-facing side (e.g., facing the interior of the beverage can 310). As described herein, the can end 308 can be formed such that a layer of lacquer is present on the exterior-facing side while a laminated polymer film is present on the interior-facing side, although it need not be.

FIG. 4 is an isometric cutaway diagram depicting the multiple layers of a section of can end stock 400 according to certain aspects of the present disclosure. The can end stock 400 can include a layer of metal 404, such as aluminum surrounded by a layer of lacquer 402, and a layer of polymer film 406. The can end stock 400 can be the can end stock 110 of FIG. 1.

Figure 5:
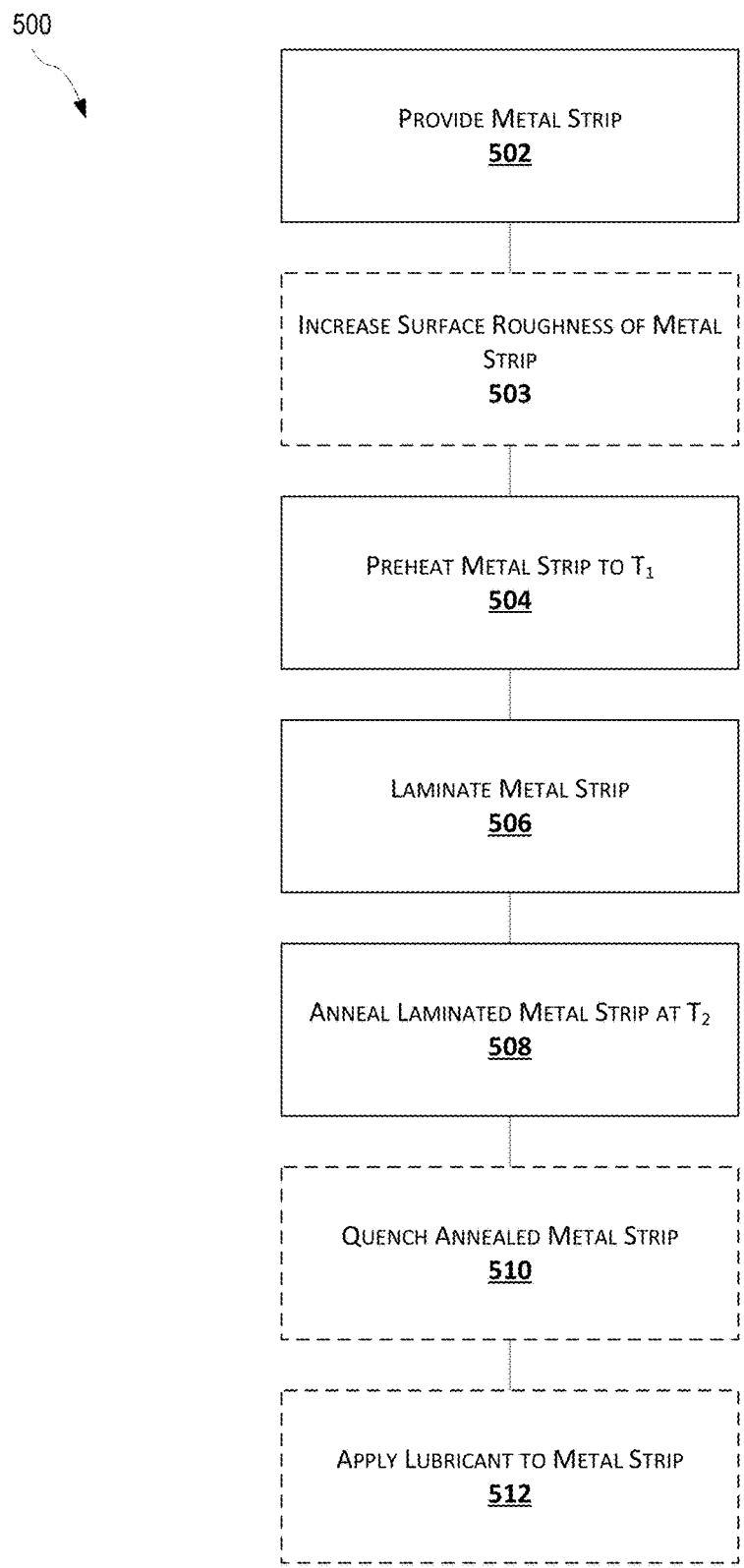
FIG. 5 is a flowchart depicting a process for laminating a metal strip according to certain aspects of the present disclosure.

FIG. 5 is a flowchart depicting a process 500 for manufacturing can end stock according to certain aspects of the present disclosure. At block 502, the metal strip is provided. At optional block at block 503, the surface roughness of the metal strip can be increased, such as described below with reference to FIG. 10. The metal strip can be an aluminum strip suitable for forming can end stock. At block 504, the metal strip is preheated to a pre-heat temperature $T_1$. At block 506, the metal strip is laminated with a PET polymer film. At block 508, the laminated metal strip is annealed at an annealing temperature $T_2$, where the annealing temperature $T_2$ is higher than the melting temperature of the PET polymer film. At block 510, the annealed metal strip is optionally quenched. At block 512, a lubricant can be optionally applied to one or both sides of the metal strip.

Figure 6:
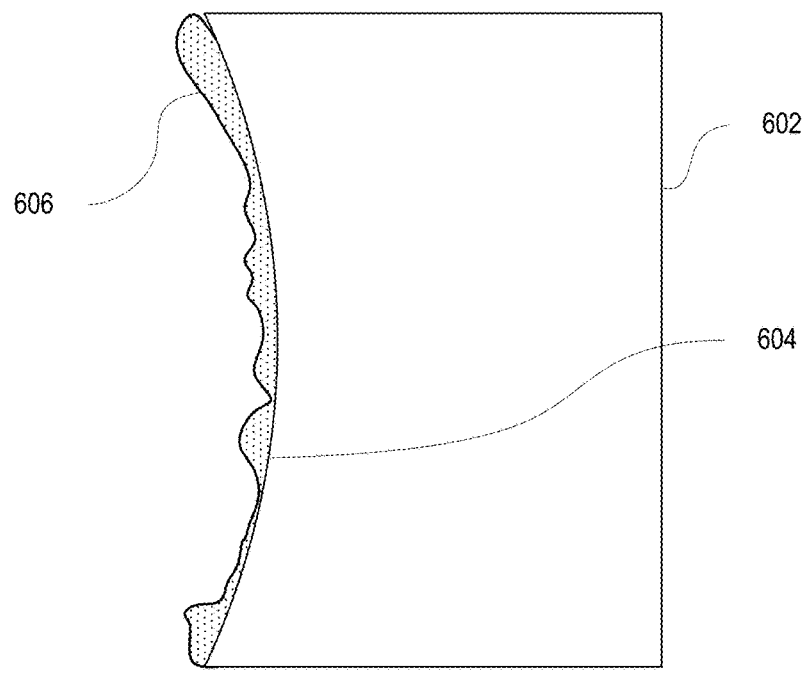
FIG. 6 is a partial top view depicting a piece of the opening of a can end exhibiting feathering.

FIG. 6 is a partial top view depicting a piece of can end stock 602. The can end stock 602 includes a layer of polymer film 606 that has not been annealed according to certain aspects of the present disclosure. The can end stock 602 has been separated along a score line 604. The polymer film 606 can be seen feathering out past the score line 604. The can end stock 602 of FIG. 6 can be considered to have poor feathering.

Figure 7:
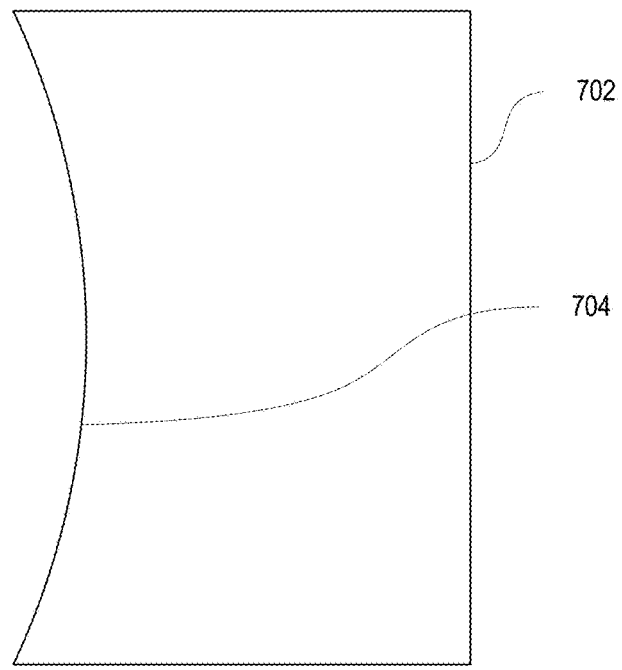
FIG. 7 is a partial top view depicting a piece of the opening of a can end exhibiting no feathering according to certain aspects of the present disclosure.

FIG. 7 is a partial top view depicting a piece of can end stock 702 according to certain aspects of the present disclosure. The can end stock 702 includes a layer of polymer film that has been annealed according to certain aspects of the present disclosure, such as the can end stock 302 of FIG. 3. The can end stock 702 has been separated along a score line 704. The polymer film has not feathered out past the score line 704. The can end stock 702 of FIG. 7 can be considered to have good feathering (e.g., feathering of less than 0.8 mm) or no feathering.

Figure 8:
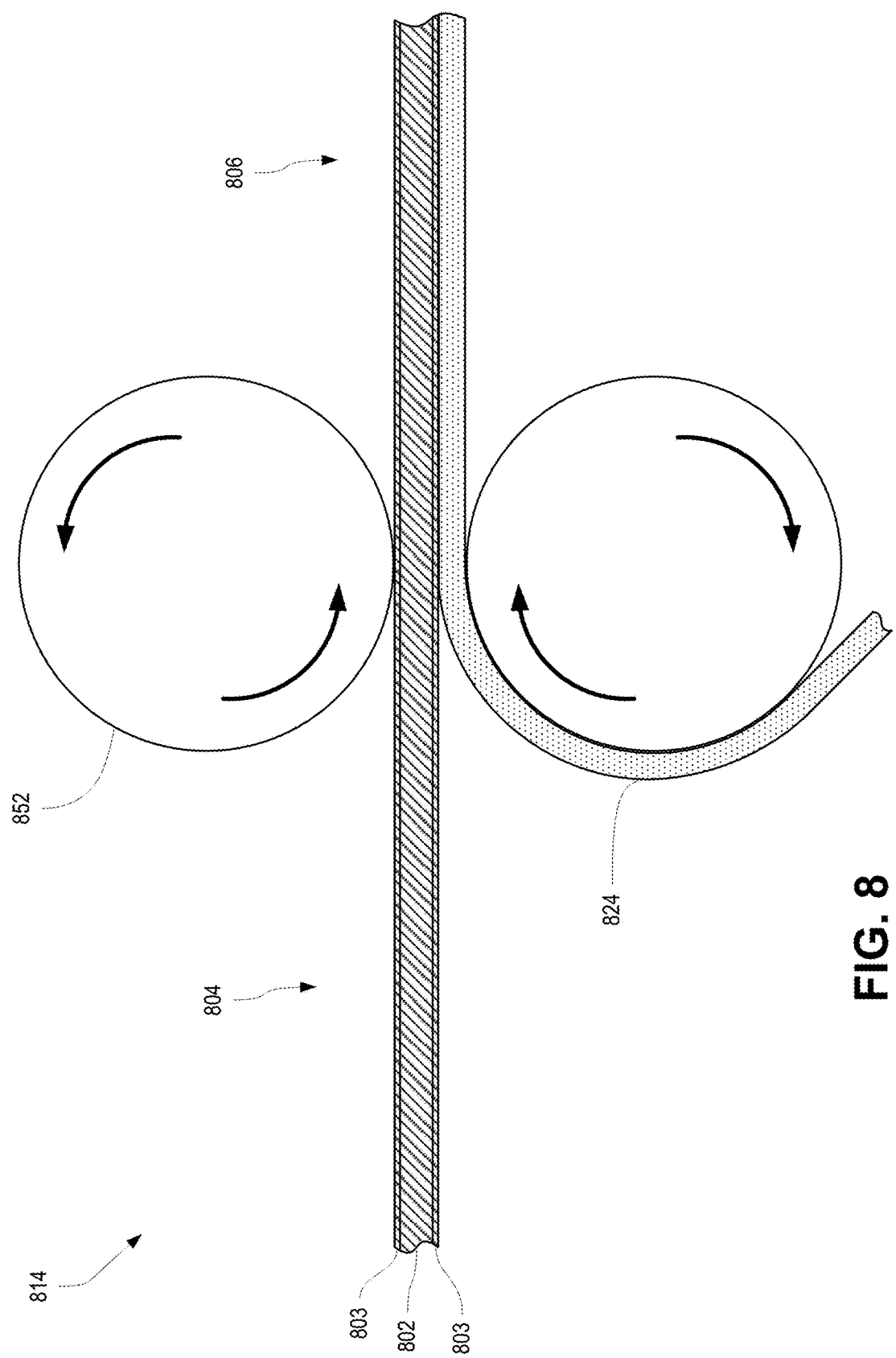
FIG. 8 is a schematic diagram of a lamination system according to certain aspects of the present disclosure.

FIG. 8 is a schematic diagram of a lamination system 814 according to certain aspects of the present disclosure. The lamination system 814 can be the lamination system 114 of FIG. 1, or another lamination system. Certain elements depicted in FIG. 8 are shown at an exaggerated scale for demonstrative purposes only.

The lamination system 814 can include a pair of rollers 852 through which a pre-heated metal strip 804 may pass. The pre-heated metal strip 804 can include a metal strip 802 that has been pre-heated, such as by a pre-heating furnace 112 of FIG. 1. In some cases, the pre-heated metal strip 804 includes one or more conversion layers 803.

When passing through the rollers 852, a polymer film 824 can be pressed against the pre-heated metal strip 804 to produce a laminated metal strip 806. In some cases, a single lamination system 814 can include additional sets of rollers to apply a second polymer film to an opposite side of the pre-heated metal strip 804 from the polymer film 824. In some cases, rollers 852 can additionally apply a second polymer film to an opposite side of the pre-heated metal strip 804 from the polymer film 824.

Figure 9:
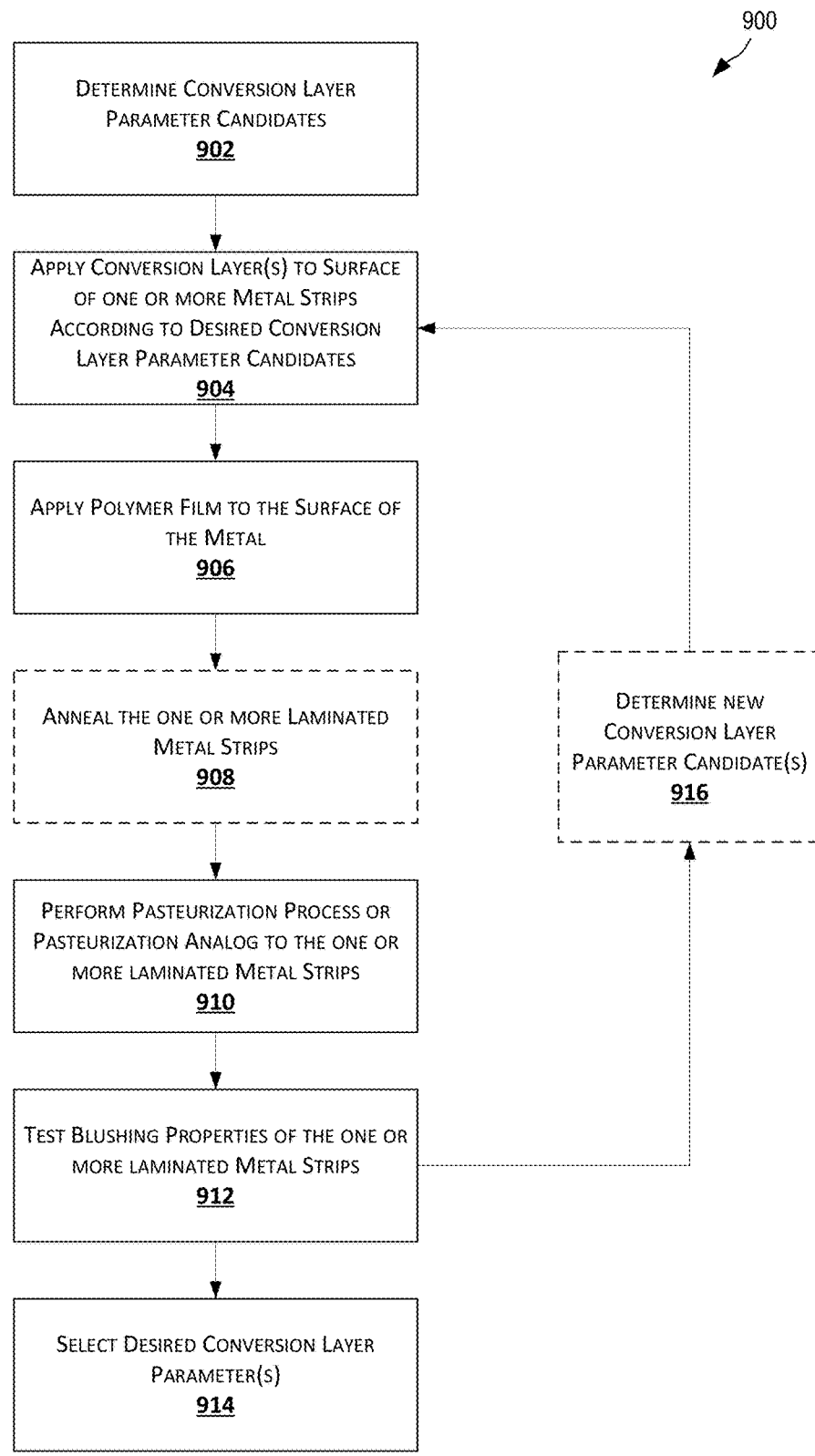
FIG. 9 is a flowchart depicting a process for determining desirable conversion layer characteristics for a laminated metal strip according to certain aspects of the present disclosure.

FIG. 9 is a flowchart depicting a process 900 for determining desirable conversion layer characteristics for a laminated metal strip according to certain aspects of the present disclosure. Blushing of certain products, such as CES material, is traditionally associated with underperformance of or a defect in a lacquer layer of the material. Characteristics of the conversion layer have not been considered with regard to blushing performance. Conversion layers generally have a thickness on the nanometer scale, which is generally one or more orders of magnitude thinner than a lacquer layer or thin film layer. However, it has been discovered that, unexpectedly, characteristics of a conversion layer can provide a noticeable and controllable impact on the blushing properties of a metal product (e.g., aluminum CES material) having a laminated film layer (e.g., laminated PET film). The metal product can be any suitable metal product, such as the laminated metal strips disclosed above. The characteristics of the conversion layer (e.g., chemical nature, thickness, or texture) have a noticeable impact on blushing performance of a film layer applied to the conversion layer. The blushing performance of a metal product with a laminated film layer is the result of a different mechanism from the standard blushing associated with lacquered metal products. Further, annealing a metal product having a laminated film layer can further affect blushing performance through a different mechanism than standard blushing associated with lacquered metal products. It has been discovered that the blushing performance of metal products with laminated film layers, with or without subsequent annealing, can be controlled through manipulation of conversion layer characteristics. Process 900 can be used to test the blushing performance of different conversion layer parameter candidates against a given combination of substrates (e.g., aluminum metal strips), films (e.g., PET film), and process steps (e.g., post-lamination annealing) so that the optimal conversion layer parameter(s) for a particular use case (e.g., combination of substrates, films, and process steps) can be selected prior to mass production.

At block 902, one or more conversion layer parameter candidates can be determined. A conversion layer parameter can be any suitable parameter of a conversion layer or its application process, such as type of conversion layer, depth of conversion layer, parameters of the application process of the conversion layer (e.g., type of conversion solutions, application time, treatment temperature, drying time, or application thickness), or other such parameters. Varying one or more parameters of the conversion layer can result in conversion layers having different characteristics. In some cases, determining one or more conversion layer parameter candidates can include determining a set of conversion solutions having different properties that result in a set of conversion layers with differing characteristics (e.g., thickness, texture, chemical makeup, or other characteristics). For example, the set of conversion materials can include chromium phosphate conversion solutions using different concentrations of chromic acid, phosphoric acid, and hydrofluoric acid. In some cases, determining one or more conversion layer parameter candidates can include determining a set of parameters that result in a set of conversion layers with differing thicknesses. In some cases, a single parameter candidate will be determined at block 902 and the process 900 can still test multiple parameters by determining a new conversion layer parameter candidate at optional block 916, as described in further detail below. In some cases, determining conversion layer parameter candidates at block 902 can include accessing a set of pre-determined parameters that are likely to produce desired results.

At block 904, one or more conversion layers are applied to the surface(s) of one or more metal strips according to the desired conversion layer parameter candidates. In some cases, conversion layers can be applied to continuous metal strips or individual metal blanks. In some cases, all conversion layers can be applied to different locations of a single metal strip or metal blank, however in other cases each metal strip or metal blank is treated with a single conversion layer.

Applying a conversion layer to a surface of a metal strip or blank can include degreasing the surface (e.g., through application of hydrofluoric acid), drying the surface, applying a wet film (e.g., by roll coating or other suitable mechanisms) of the conversion material (e.g., a chromium based conversion material in a water-borne solution), and drying the surface to allow a conversion layer to form. In some cases, when multiple conversion layers are being tested on a single metal strip or metal blank, parameters of the conversion layer application process can be manipulated across one or multiple dimensions of the surface of the single metal strip or metal blank. For example, the thickness of the wet film can be adjusted with respect to horizontal distance across a surface of a metal strip or metal blank so that various sections of the metal strip or metal blank at different horizontal locations will have different conversion layer characteristics. In another example, different conversion solutions can be applied at different locations of single metal strip or metal blank.

At block 906, a polymer film can be applied to the surface of the metal strip or metal blank having the conversion layer. The polymer film can be applied in any suitable manner, such as described above, including with reference to FIGS. 1, 5, and 8.

At optional block 908, the one or more laminated metal strips or metal blanks can be annealed, such as described above, including with reference to FIGS. 1 and 5.

At block 910, a pasteurization process can be performed on the one or more laminated metal strips or metal blanks. In some cases, a pasteurization analog can be performed, which can include performing a process that is different from pasteurization, but designed to produce similar blushing effects as standard pasteurization processes. In some cases, a sterilization process can occur instead of a pasteurization process. In some cases, another process that may potentially elicit blushing of the one or more laminated metal strips or metal blanks can be performed instead of a pasteurization process. In an example, the one or more laminated metal strips or metal blanks can be placed in water heated to a desired temperature (e.g., a temperature suitable for pasteurization) for a desired duration (e.g., for a duration suitable for pasteurization).

At block 912, each of the one or more laminated metal strips or metal blanks can be tested for blushing performance. Blushing testing can be performed by using subjective or objective characterizations of the blushing properties of a surface of a metal strip or metal blank. For example, objective characterizations can include taking measurements of blushing using a camera, a light sensor, or other suitable sensor. As an example, subjective characterizations can include having an individual perform a visual inspection of a surface of a metal strip or metal blank and rank the apparent blushing performance. In some cases, a sample that has been processed at block 910 (e.g., pasteurized) can be compared with a sample that has been immersed in water at room temperature for the same duration as the sample immersed in heated water at block 910 to determine the amount of blushing attributable to the process at block 910.

When multiple conversion layer parameter candidates have been selected at block 904, the testing at block 912 can include testing the blushing properties of multiple samples. At block 914, one or more desired conversion layer parameters can be selected based on the blushing properties tested at block 912. For example, out of all conversion layer parameter candidates tested, the conversion layer parameters of the best performing sample (e.g., the sample showing the least amount of blushing) can be selected as the desired conversion layer parameters.

In some cases, after testing blushing properties at block 912, one or more new conversion layer parameter candidates can be determined at block 916. The one or more new conversion layer parameter candidates can be used to prepare and test one or more new sample with new conversion layer(s) at blocks 904, 906, 908, and 910. When multiple iterations of blocks 904, 906, 908, and 910 are performed (e.g., when block 916 is performed), selecting one or more desired conversion layer parameters at block 914 can include comparing the results of a current iteration of block 912 with the results from a previous iteration of block 912.

The conversion layer parameter(s) selected at block 914 can be used in mass production. For example, when the different conversion layer parameter candidates include using chromium-phosphate conversion solutions with differing concentrations of its components, the particular conversion solution selected at block 914 can be provided to a process line for mass producing the final laminated product (e.g., laminated can end stock).

Figure 15:
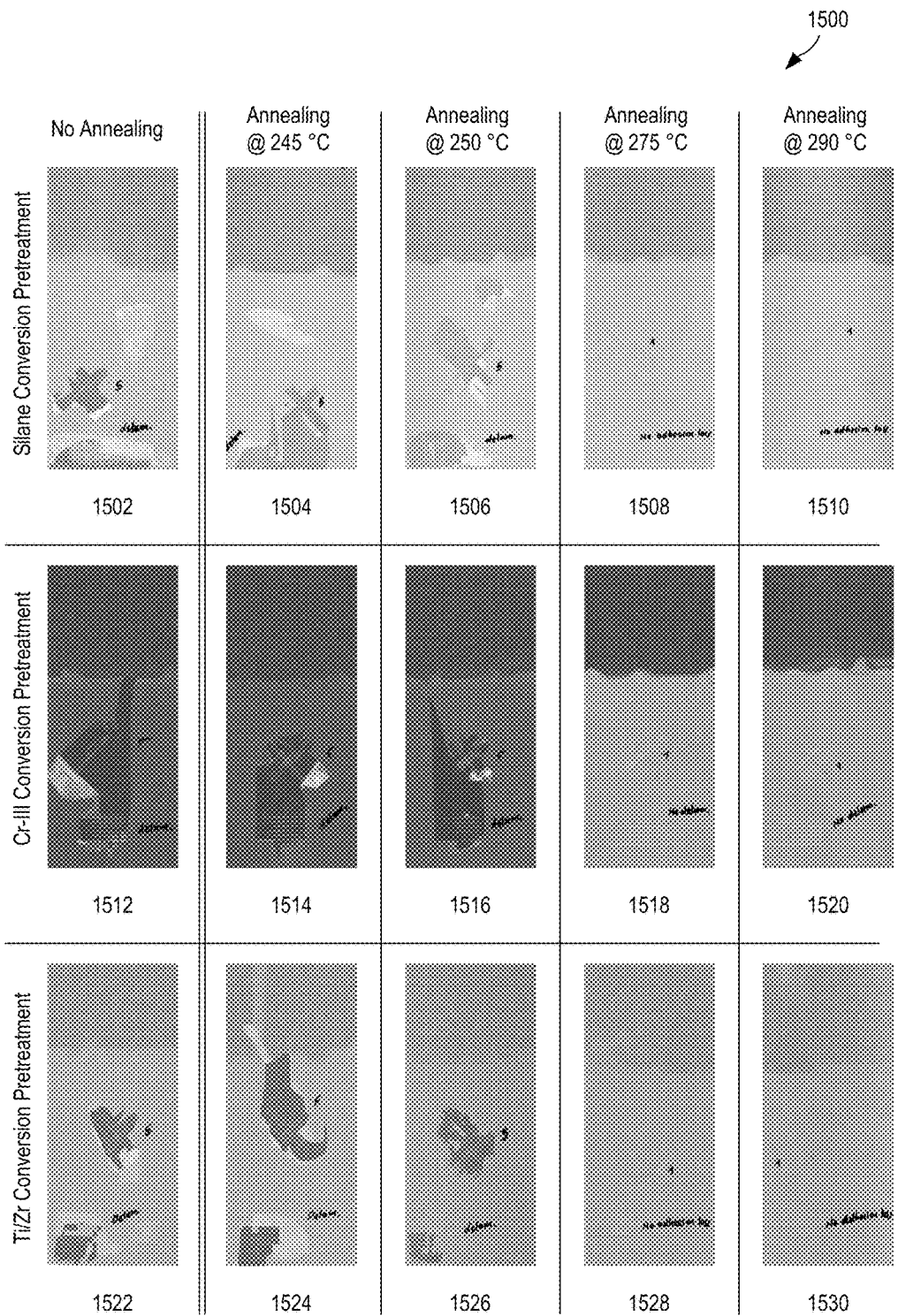
FIG. 15 is a graphical matrix depicting a set 1500 of samples of laminated aluminum metal processed and tested according to certain aspects of the present disclosure.

Process 900 is described in further detail with respect to FIG. 15.

Figure 10:
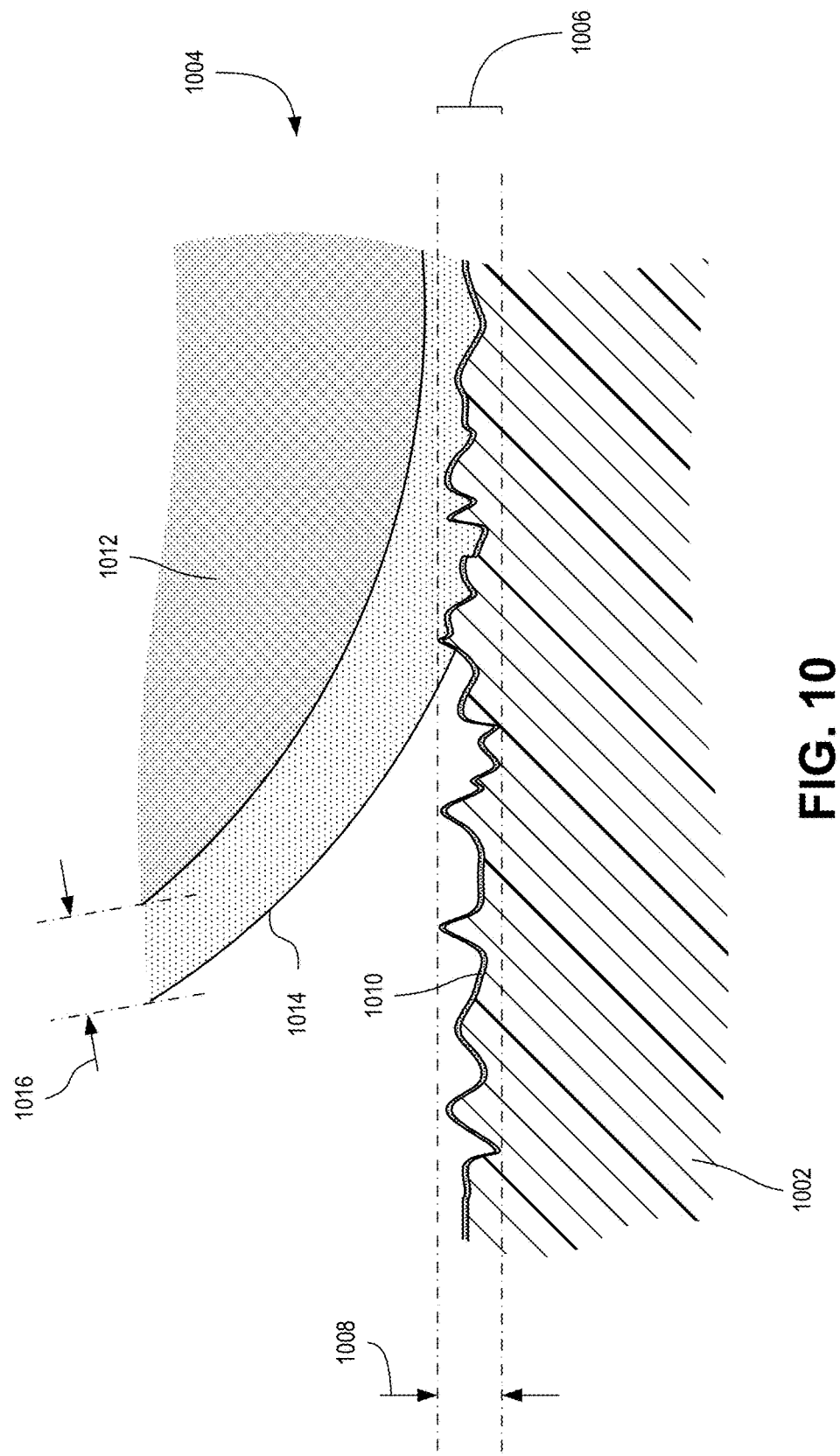
FIG. 10 is a highly-magnified partial cross sectional view of a portion of a metal strip having a film laminated thereon according to certain aspects of the present disclosure.

FIG. 10 is a highly-magnified partial cross sectional view of a portion of a metal strip 1002 having a film 1004 laminated thereon according to certain aspects of the present disclosure. Certain elements depicted in FIG. 10 are shown at an exaggerated scale for demonstrative purposes only. The metal strip or metal blank can have a surface with a surface roughness. The ability for a film, such as a PET film, to adhere to the surface of the metal strip or metal blank may be affected by the surface roughness of the metal. Surface roughness can affect not only the adhesion of the film to the metal during lamination, but also the ongoing adhesion of the film to the metal during the lifespan of an end product. Adherence can be determined in various manners, such as disclosed above. The roughness of PET films is much lower than standard surface roughness of metal strips used for CES, so it may have been assumed that a lower roughness increasing immediate contact area in the lamination process would be beneficial. However, it has been determined that, unexpectedly, low roughness of the metal's surface is detrimental to some of the adhesion related properties of laminated metal products. Therefore, metal surfaces having a roughness at or above a minimum threshold roughness may be desirable for film lamination applications. In some cases, it can also be desirable for the metal surfaces to have a roughness at or below a maximum threshold roughness.

The metal strip 1002 can have a surface roughness 1006 defined by the presence of hills and valleys in the surface of the metal. A lower surface roughness 1006 can be defined by fewer or less intense hills and valleys in the surface of the metal, and thus a smoother surface of the metal. Additionally, surface roughness 1006 can be defined by a height 1008 between the lowest valleys and the highest hills of the surface of the metal (e.g., within a localized region of the surface of the metal). The metal strip 1002 can have a conversion layer 1010 on a surface. The conversion layer 1010 may generally be small enough to not have a noticeable or significant impact on the surface roughness 1006 of the metal strip 1002.

A film 1004 (e.g., PET film) can be applied to a metal strip 1002, such as described herein, such as with reference to FIGS. 1, 5, and 8. The film 1004 can be a multilayer film and can include at least a primary layer 1012 and a contact layer 1014 (e.g., a hot mate layer), however the film 1004 may include additional layers. The contact layer 1014 can be a layer that comes into direct contact with the surface of the metal strip 1002. The contact layer 1014 can have a melting point that is lower than a melting point of the primary layer 1012. During the lamination process, heat and/or pressure from the lamination process can cause the contact layer 1014 to melt before the primary layer 1012, if the primary layer 1012 melts at all, and the contact layer 1014 can melt into the surface topology of the metal strip 1002. The contact layer 1014 can have a thickness 1016. The thickness 1016 of the contact layer 1014 may be at or greater than the height 1008 of the surface roughness 1006. If the contact layer 1014 has a thickness 1016 that is too thin, voids may form from the contact layer 1014 melting into a valley and separating from the primary layer 1012 that is supported above the contact layer 1014 by a tall hill. The contact layer 1014 may have a thickness 1016 that is at least 1%, 2%, 3%, 4%, 5%, 6%, 7%, 8%, 9%, 10%, 15%, 20%, 25%, 30%, 35%, 40%, 45%, 50%, or 55% greater than the height 1008. The contact layer 1014 can have a thickness that is 1 micron or within 1%, 2%, 3%, 4%, 5%, 10%, 15%, or 20% of 1 micron. The height 1008 of the surface roughness 1006 can be less than 1 micron, less than 0.9 micron, less than 0.8 micron, or less than 0.7 micron. In some cases, the height 1008 of the surface roughness 1006 can be at least 0.25 micron, 0.5 micron, or 0.6 micron.

In some cases, a metal strip can be treated to increase its surface roughness prior to being laminated. For example, the system 100 of FIG. 1 can include an additional roughening apparatus upstream of the laminating system 114 for measuring and/or increasing the surface roughness of the metal prior to lamination. In some cases, the metal strip to be laminated can be rolled using rolls designed to impart a desired surface roughness.

Figure 11:
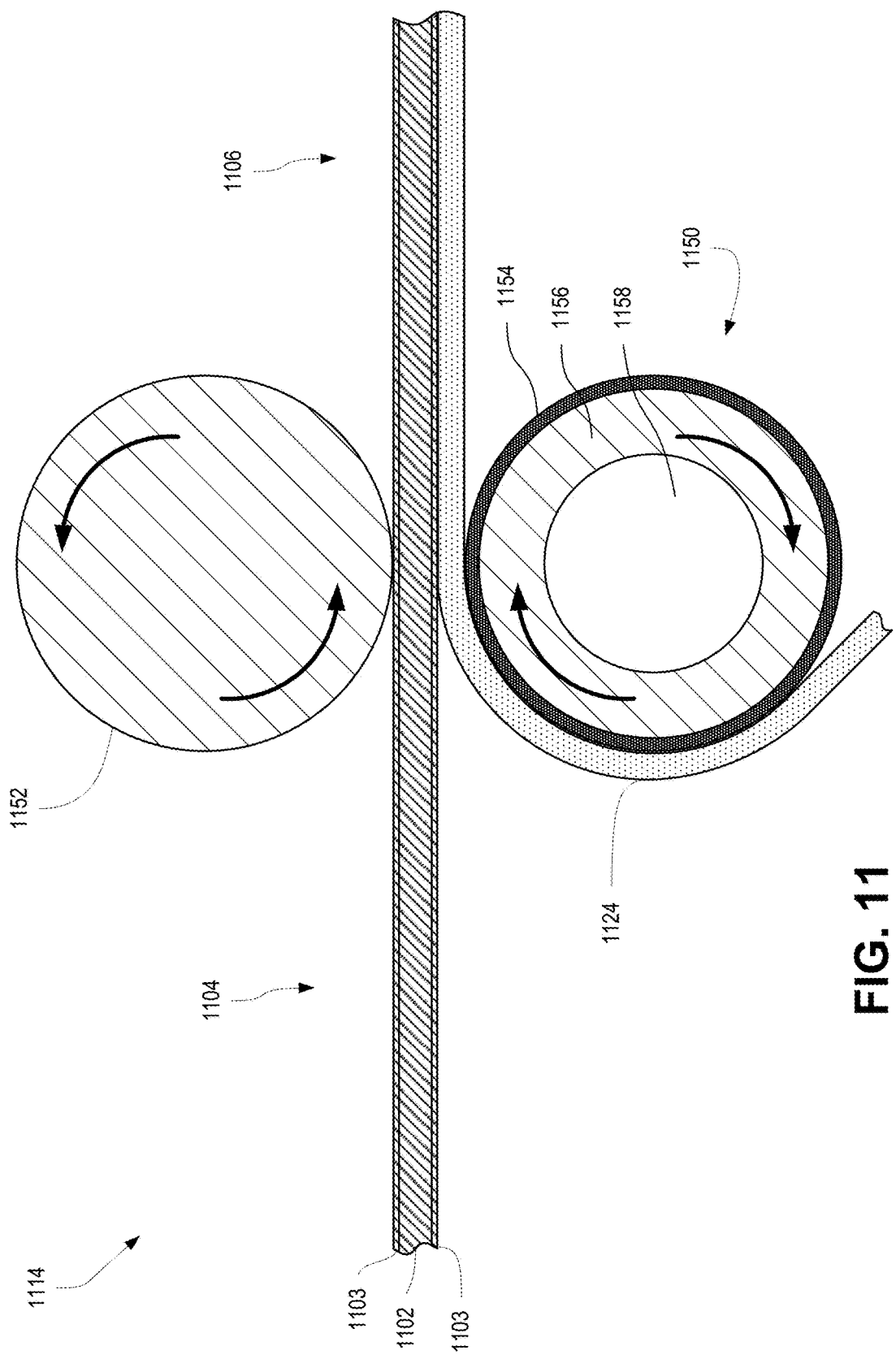
FIG. 11 is a partial side cutaway view of a lamination system according to certain aspects of the present disclosure.

FIG. 11 is a partial side cutaway view of a lamination system 1114 according to certain aspects of the present disclosure. The lamination system 1114 can be the lamination system 114 of FIG. 1, or another lamination system. Certain elements depicted in FIG. 11 are shown at an exaggerated scale for demonstrative purposes only.

The lamination system 1114 can include an application roller 1150 opposite a metal strip 1102 from a backing roller 1152. The pre-heated metal strip 1104 may pass through a gap formed between the application roller 1150 and the backing roller 1152. The pre-heated metal strip 1104 can include a metal strip 1102 that has been pre-heated, such as by a pre-heating furnace 112 of FIG. 1. In some cases, the pre-heated metal strip 1104 includes one or more conversion layers 1103.

When passing the application roller 1150, a polymer film 1124 can be pressed against the pre-heated metal strip 1104 to produce a laminated metal strip 1106. In some cases, a single lamination system 1114 can include additional sets of rollers to apply a second polymer film to an opposite side of the pre-heated metal strip 1104 from the polymer film 1124. In some cases, backing roller 1152 can be replaced with an additional application roller to simultaneously apply a second polymer film to an opposite side of the pre-heated metal strip 1104 from the polymer film 1124.

The application roller 1150 can include a compressible layer 1154 (e.g., a rubber coating) surrounding a metal core 1156. The compressible layer 1154 can be adhered to (e.g., via glue) or mechanically fixed to the core 1156. The metal core 1156 can be made of any suitable metal, such as steel. The compressible layer 1154 can be made of any suitable compressible material, such as foam or rubber. In some cases, the compressible layer 1154 has a thickness of 2 cm or within 1%, 2%, 3%, 4%, 5%, 10%, 15%, or 20% of 2 cm, although other thicknesses can be used. The degree of compressibility of the compressible layer 1154 can be selected to achieve desired lamination results. For example the type of rubber selected for the compressible layer 1154 can include a hard rubber, a soft rubber, or any rubber therebetween.

The compressible layer 1154 can aid in applying the polymer film 1124 to the surface of the metal strip 1102 without the presence of entrapped air. Even small amounts of entrapped air can cause blisters during later processes, such as post-lamination annealing. For example, during post-lamination annealing, entrapped air can blow out of and rupture the film. Entrapped air and blisters can affect adhesion and blushing, among other characteristics of the laminated product. Therefore, the presence of entrapped air and/or blisters may result in an undesirable product.

In some cases, the application roller 1150 can include a mechanism for controlling the temperature of the compressible layer 1154. For example, heat can be extracted from the compressible layer 1154 to ensure the compressible layer 1154 does not become so hot as to underperform, such as through losing its ability to rebound when compressive forces are released or losing its adherence to the metal core 1156, thus causing slipping. For example, a rubber compressible layer 1154 may delaminate from the metal core 1156 if the temperature of the compressible layer 1154 at the metal core 1156 (e.g., where adhesive may be located) reaches sufficiently high temperatures, such as temperatures at or in excess of 120° C. In some cases, the compressible layer 1154 can be externally cooled, such as through application of coolant fluid (e.g., cool air) to an exterior surface of the compressible layer 1154 or through direct conduction with a cooled roll in contact with the exterior surface of the compressible layer 1154.

However, it has been found that internally cooling the compressible layer 1154 can have unexpected benefits. The compressible layer 1154 can be internally cooled by passing coolant through a passage 1158 within a hollow metal core 1156 of the application roller 1150. Any suitable coolant can be used, including fluids such as air and water. Coolants can be pumped using any suitable pumping source. Coolants can temperature controlled by passing through heat exchangers. Coolants can be designed to pass through the passage 1158 at desired temperatures, which may be higher or lower than ambient room temperature, higher or lower than the temperature of the compressible layer 1154, and higher or lower than the temperature of the pre-heated metal strip 1104. Therefore, coolants can act to increase or decrease the temperature of the compressible layer 1154. When a hollow metal core 1156 is used to provide temperature control of the compressible layer 1154, the core 1156 can be made of a material having high thermal conductivity. The compressible layer 1154 can be selected to have high or low thermal conductivity, however improved results can be obtained when using compressible layers 1154 without high thermal conductivity.

In some cases, heated coolant can be passed through the passage 1158 to heat the compressible layer 1154 prior to a lamination process so that the compressible layer 1154 is sufficiently hot ensure the contact layer of the polymer film 1124 is molten or semi-molten when it is compressed against the pre-heated metal strip 1104, thus allowing the contact layer to melt into the hills and valleys of the metal strip 1104. In some cases, cooled coolant (e.g., below the temperature of the pre-heated metal strip 1104) can be passed through the passage 1158 during a lamination process to remove heat from the compressible layer 1154. Because the compressible layer 1154 is continuously heated by the environment of the lamination process (e.g., the heat from the pre-heated metal strip 1104) and any other heated elements in proximity to the lamination nip (e.g., space between the application roller 1150 and backup roller 1152), the outside surface of the compressible layer 1154 is drawn towards a high temperature. However, the inner surface of the compressible layer 1154 is cooled through conduction with the hollow metal core 1156 and the coolant passing therethrough. Therefore, the use of a hollow metal core 1156 can ensure the inner surface of the compressible layer 1154 is maintained at a suitable temperature (e.g., for avoiding delamination of the compressible layer 1154) despite having a higher temperature at its outer surface. Thus, a radial temperature gradient is induced in the compressible layer 1154.

Further, by forming the compressible layer 1154 from a material with a suitable low thermal conductivity and internally cooling the compressible layer 1154 through the use of a hollow metal core 1156, the temperature of the external surface of the compressible layer 1154 is able to be maintained at a higher temperature without fear of the inner surface delaminating from the metal core 1156.

This ability to keep the compressible layer 1154 running at a higher temperature (e.g., a temperature that is higher than if internal cooling were not used) has many benefits. The higher temperature of the external surface of the compressible layer 1154 can allow the metal strip 1102 to be preheated to a lesser degree, thus saving energy. For example, the higher temperature of the external surface of the compressible layer 1154 can be used to melt the contact layer of the polymer film 1124, thus obviating the need to rely as much on the heat from the pre-heated metal strip 1104 to melt the contact layer of the polymer film 1124. Additionally, the ability to have a larger window of available temperatures for preheating the metal strip 1102, which is enabled by being able to support a larger window of temperatures of the external surface of the compressible layer 1154, allows additional upstream and downstream processes to be more easily tailored to work with a laminating system, such as laminating system 1114.

For example, a downstream process may require a metal strip at approximately 200° C. Normally, without interior-cooled compressible layers 1154, the external temperature of the compressible layer would be maintained no greater than approximately 70° C., thus requiring the metal strip to be preheated to approximately 220° C. Thus, that preheated metal strip would need to be cooled prior to entering the downstream process. However, when an interior-cooled compressible layer 1154 is used, the external temperature of the compressible layer can be set to approximately 90° C., thus allowing the metal strip 1102 to be preheated to approximately 200° C., allowing the metal strip 1102 to enter the downstream process much faster and with much more overall efficiency.

Additionally, allowing the external surface of the compressible layer 1154 to reach a higher temperature can allow the lamination system 1114 to operate at a faster speed, thus potentially allowing the entire processing line to operate at a faster speed.

Figure 12:
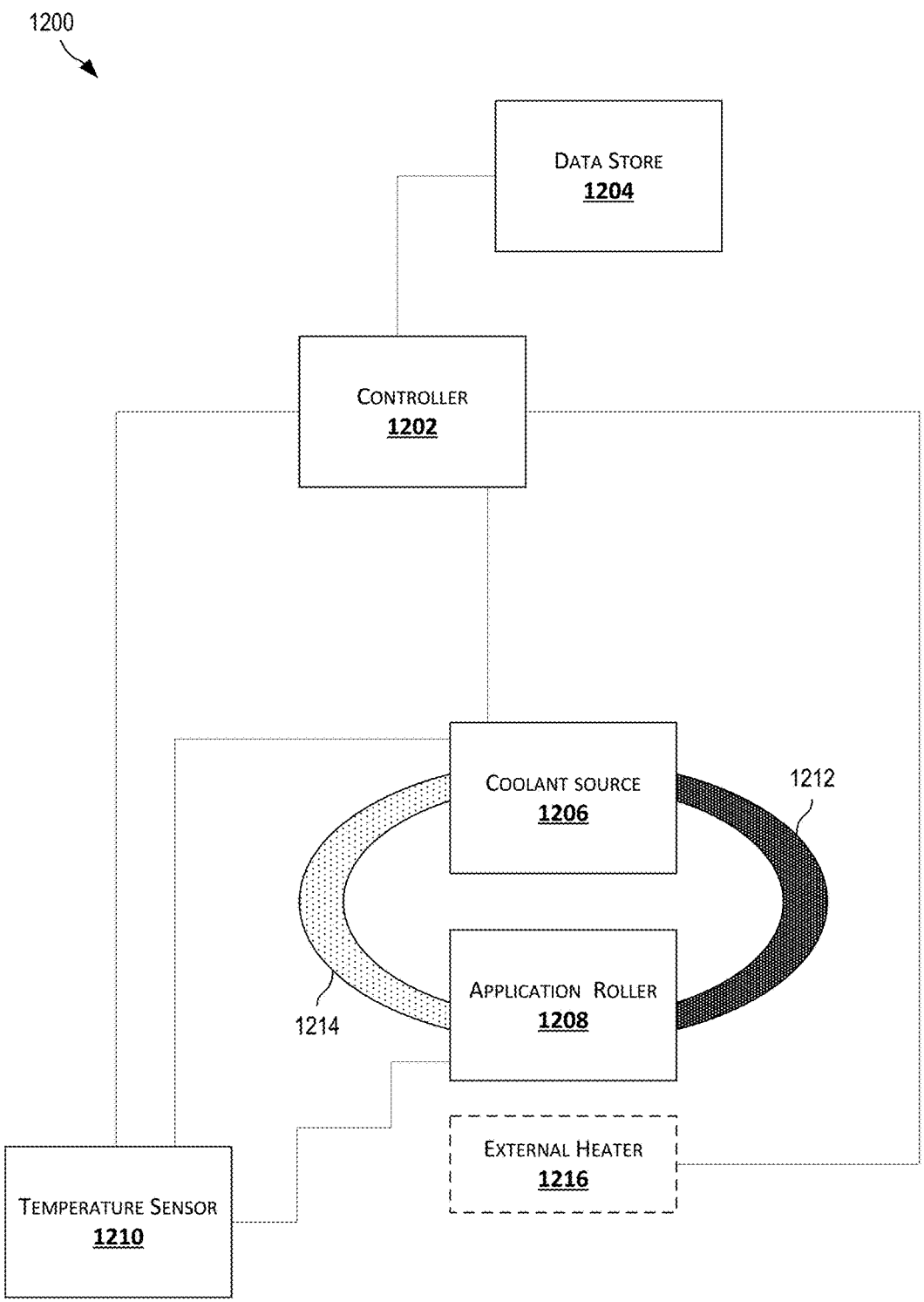
FIG. 12 is a schematic diagram depicting a control system for an application roller of a lamination system according to certain aspects of the present disclosure.

FIG. 12 is a schematic diagram depicting a control system 1200 for an application roller 1208 of a lamination system according to certain aspects of the present disclosure. The application roller 1208 can be application roller 1150 of FIG. 11. The control system 1200 can include a controller 1202, which may be any suitable controller or processor. The controller 1202 can be coupled to a data store 1204 for storing programming instructions, collected data, models, predicted data, presets, and other information. The controller 1202 can be coupled to a coolant source 1206 for providing and/or circulating coolant through the application roller 1208. The controller 1202 can transmit command signals to the coolant source 2106 to cause the coolant source 2106 to adjust the amount of cooling or heating to desired levels. The command signals can cause the coolant source 2106 to adjust the volumetric flow rate of the coolant, the temperature of the coolant, or other characteristics of the coolant or its flow through the application roller 1208. Coolant can be routed through conduits 1212, 1214 between the coolant source 1206 and application roller 1208. The coolant source 1206 can include a pressurization source (e.g., a pump), a heat exchanger, an optional storage tank, and any other suitable elements for providing control of the coolant or its flow through the application roller 1208.

The controller 1202 can be coupled to one or more sensors, including one or more temperature sensors 1210. A temperature sensor 1210 can be positioned within, adjacent, proximate to, or spaced apart from the application roller 1208 to measure a temperature associated with the application roller 1208. For example, temperature sensors can measure the internal coolant temperature, the temperature of the metal core, the temperature of the internal surface of the compressible layer, or the temperature of the external surface of the compressible layer. Any suitable temperature sensor 1210 can be used, including contact and non-contact temperature sensors. In some cases, temperature sensors 1210 can measure temperature of elements adjacent the application roller 1208 (e.g., a polymer film, metal strip, or other elements) to infer a temperature of the application roller 1208. Signals from the temperature sensor(s) 1210 can provide feedback to the controller 1202 to help the controller 1202 ensure desired operation of the application roller 1208 (e.g., to ensure sufficiently low temperature of the internal surface of the compressible layer or sufficiently high temperature of the external surface of the compressible layer).

In some cases, the controller 1202 can instruct a coolant source 1206 to pump heated coolant through the application roller 1208 to increase the temperature of the external surface of the compressible layer of the application roller 1208 to a minimum desired temperature. The controller 1202 may then pump cooled coolant to maintain the temperature of the external surface of the compressible layer within a desired range during a lamination process (e.g., when a much hotter preheated metal strip is conducting heat into the application roller 1208). The "cooled coolant" may be colder than the preheated metal strip, but may still be warmer than ambient room temperature. In some cases, the controller 1202 can control an optional external heater 1216 to preheat the application roller 1208 instead of or in addition to pumping heated coolant through the application roller 1208.

In some cases, the controller 1202 can operate based on feedback from temperature sensor(s) 1210 and/or other sensors. In some cases, controller 1202 can operate based on models stored in the data store 1204 (e.g., thermal models) instead of or in addition to sensors, such as temperature sensor(s) 1210 and/or other sensors. For example, controller 1202 can automatically increase the amount of cooling provided to the application roll 1208 whenever the line speed increases.

Figure 13:
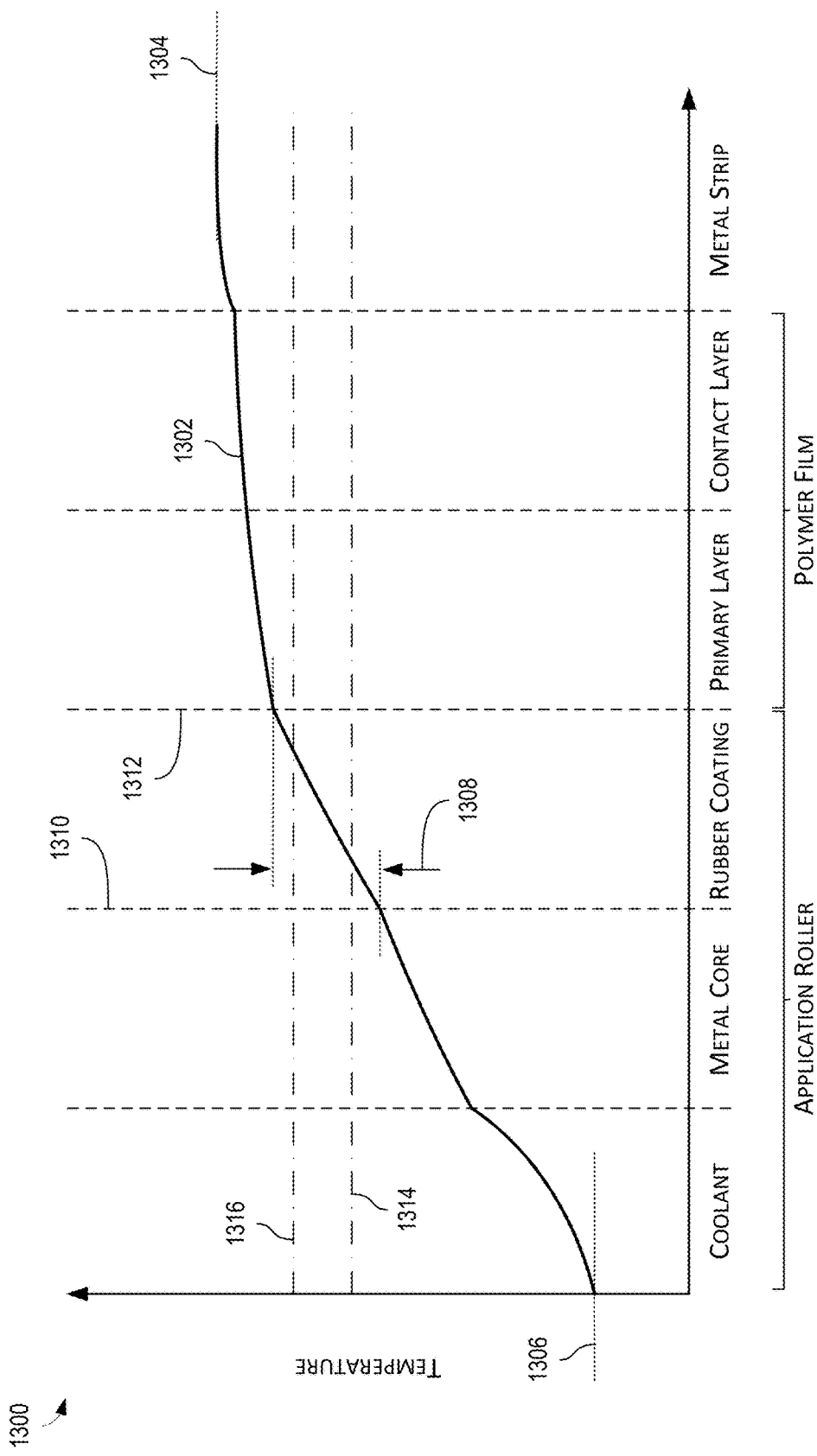
FIG. 13 is a plot depicting temperature as a function of radial distance from the axis of rotation of an application roller of a lamination system according to certain aspects of the present disclosure.

FIG. 13 is a plot 1300 depicting temperature as a function of radial distance from the axis of rotation of an application roller of a lamination system according to certain aspects of the present disclosure. The application roller can be application roller 1150 of FIG. 11. The plot depicts a temperature curve 1302 at various radial distances from the axis of rotation (e.g., center) of the application roller. Plot 1300 and its elements, including curve 1302 and the depicted zones, are not drawn to scale and are shown for demonstrative purposes, without units. Along a direction from the center of the application roller outwards, the application roller can include a coolant zone, a metal core zone, and a rubber coating zone. A film can be positioned adjacent the application roller such that, along the same direction, the film includes a primary layer and a contact layer. The film can be compressed against a metal strip.

The preheated metal strip can be provided at a temperature 1304 (e.g., 200° C.). The coolant, however, can be provided at a temperature 1306, which may be substantially cooler than the preheated metal strip. Thus, a temperature gradient exists between the coolant and the metal strip, approximated by curve 1302. The coolant 1306 will absorb heat from the interior surface 1310 of the compressible layer, trying to pull the temperature of the interior surface 1310 down towards temperature 1306. Simultaneously, the higher temperature 1304 of the preheated metal strip will be conducted through the film and will try to raise the temperature of the external surface 1312 of the compressible layer. Thus, a temperature gradient exists within the compressible layer defining a temperature gap 1308 between the interior surface 1310 and exterior surface 1312. This temperature gap 1308 can be controlled by selecting, for the compressible layer, materials with desirable thermal conductivities. This temperature gap 1308 can be further controlled by adjusting the temperature 1306 of the coolant 1306 and the temperature 1305 of the preheated metal strip. The temperature gap 1308 can be controlled such that the temperature of the interior surface 1310 is maintained below a maximum setpoint 1314 (e.g., a maximum temperature before the risk of delamination or other failure is unacceptably high, such as a melting temperature of glue used to adhere the compressible layer to the metal core), and such that the temperature of the exterior surface 1312 is maintained above a minimum setpoint 1316 (e.g., a minimum temperature to ensure proper melting of the contact layer of the polymer film during lamination).

Figure 14:
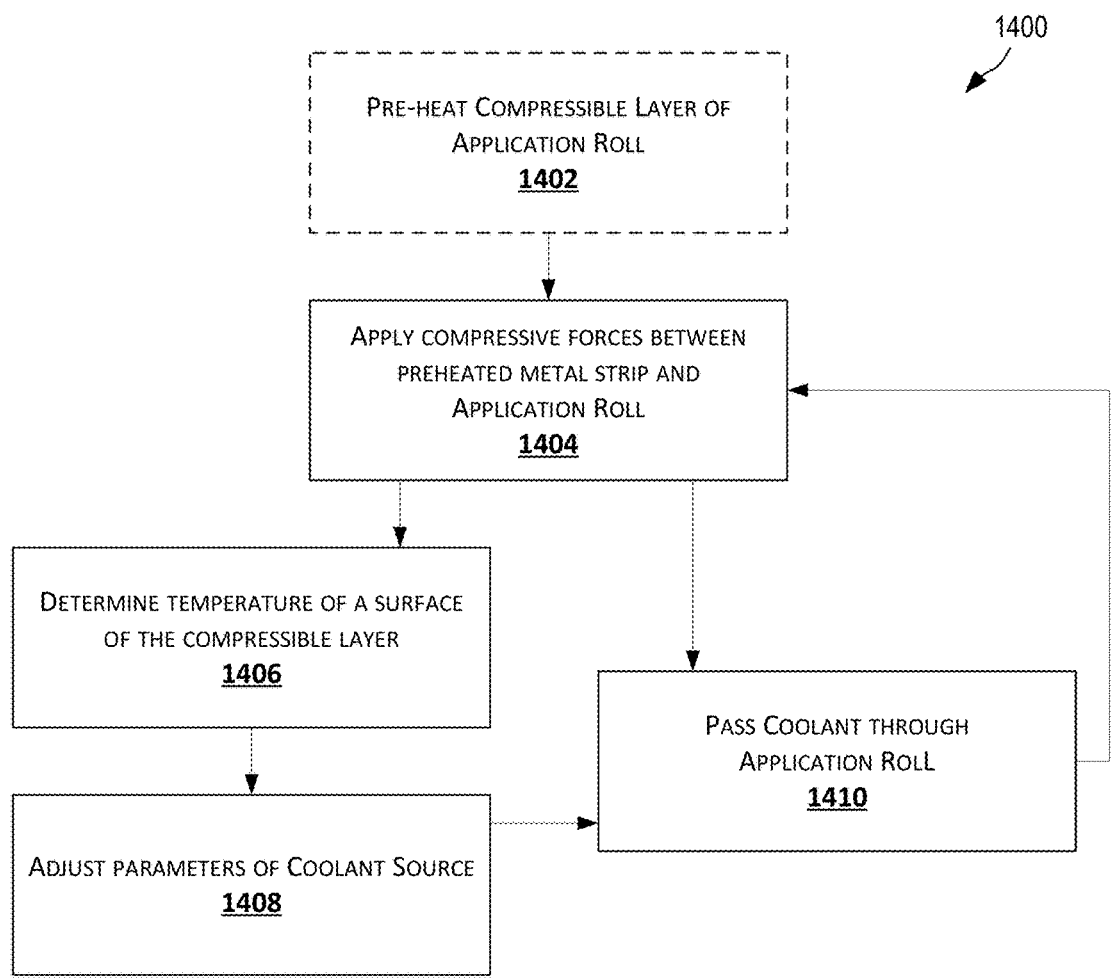
FIG. 14 is a flow chart depicting a process for controlling the temperature of an application roll during a lamination process according to certain aspects of the present disclosure.

FIG. 14 is a flow chart depicting a process 1400 for controlling the temperature of an application roll during a lamination process according to certain aspects of the present disclosure. Process 1400 can use the application roller 1150 and lamination system 1114 of FIG. 11. At optional block 1402, a compressible layer of the application roll can be preheated. As described herein, the compressible layer can be preheated using heated cooling fluid and/or an external heater. Other mechanisms can be used to preheat the compressible layer (e.g., resistive heaters embedded within the metal core).

At block 1404, compressive forces are applied between the preheated metal strip and the application roll. Compressive forces can be applied to securely adhere the polymer film to the metal strip.

At block 1406, a temperature associated with a surface of the compressible layer can be determined. The temperature can include a temperature of an internal surface or external surface of the compressible layer. Determining a temperature can include directly measuring the temperature of the compressible layer, measuring a temperature of an adjacent element and inferring the temperature of the compressible layer, or using a model with or without input from other sensors. At block 1408, parameters of the coolant source can be adjusted based on the temperature determined at block 1406. The parameters of the coolant source can adjust the amount of cooling or heating provided to the compressible layer from the coolant passing through the application roll at block 1410. The parameters of the coolant source can include parameters associated with pressure sources, valves, heat exchangers, and other such parameters. Adjusting parameters of the coolant source can result in a change in the volumetric flow rate or temperature of the coolant, among other characteristics.

At block 1410, the coolant is passed through the application roll. The coolant can be passed according to the parameters set at block 1408 or according to previously set parameters. Passing coolant through the application roll can including inducing a temperature gradient in the application roll. The temperature gradient can be induced such that the temperature of the internal surface of the compressible layer is maintained below a maximum setpoint and the temperature of the external surface of the compressible layer is maintained above a minimum setpoint.

During continuous lamination, coolant can be continuously flowing through the application roll at block 1410 while the compressive forces are being applied between the application roll and the preheated metal strip at block 1404. During continuous lamination, the temperature of a surface of the compressible layer can be continuously or repeatedly determined at block 1406 to provide continuous or repeated adjustment of the parameters of the coolant source at block 1408.

In some cases, process 1400 can be performed without block 1406 if inferences or models are used to determine appropriate parameters for the coolant source.

In some cases, the systems and methods described with reference to FIGS. 11-14 can enable lamination of film to metal strips at high speeds and with greatly reduced risk of air entrapment or blistering. In some cases, these systems and methods can be used to control the amount of air entrapment or blistering to produce certain desirable results. For example, increased air entrapment or blistering may be preferable for certain use cases where lower thermal conductivity or rougher surfaces are desirable. In some cases, these systems and methods can be advantageously used when the laminated metal strip is to be annealed, however these systems and methods can also be used to provide laminated metal strip that is not thereafter annealed.

FIG. 15 is a graphical matrix depicting a set 1500 of samples of laminated aluminum metal processed and tested according to certain aspects of the present disclosure. Set 1500 is arranged vertically according to the pretreatment method used (e.g., conversion layer applied, such as according to process 900) and horizontally according to the annealing temperature used (e.g., $T_2$ at block 508 of process 500). Testing and comparing samples, as seen in FIG. 15, can inform a determination of what combination(s) of pretreatment method(s) and annealing temperature(s) would produce desirable results. Separate from differing pretreatment and annealing, each of the samples of the set 1500 includes an aluminum sheet that has been laminated with the same type of film.

Each sample of the set 1500 displays the results of similar testing procedures, including an acid bath test and a delamination test. For the acid bath test, approximately the lower two-thirds of each sample was submerged into a 3% acetic acid bath at 100° C. for 30 minutes. Some degree of blushing can be seen in each sample, with some samples having more or less blushing than others. The level of blushing was scored on a scale of 1-10 according to visual inspection, with a score of 7 being borderline desirable and a score of 10 being the best performance (e.g., minimal blushing). For the delamination test, each sample was scratched with a material having a hardness greater than the aluminum metal strip (e.g., greater than the aluminum itself and/or greater than the conversion layer of the metal strip) in various directions. Generally, the delamination test includes a diagonal scratching pattern and a vertical-horizontal scratching pattern. The presence of delamination and a determination of the amount of delamination was recorded for each sample. The presence of delamination can be easily seen, especially in the vertical-horizontal scratching pattern. The amount of delamination can be determined based on visual inspection.

The first row of samples, including samples 1502, 1504, 1506, 1508, 1510 were all pre-treated using a silane-based (e.g., silicon tetrahydride-based) pretreatment. The second row of samples, including samples 1512, 1514, 1516, 1518, and 1520 were all pre-treated using a chromium-III-based (e.g., chromium sesquioxide-based) pretreatment. The third row of samples, including samples 1522, 1524, 1526, 1528, and 1530 were all pre-treated using a Titanium/Zirconium-based pretreatment.

The first column of samples, including samples 1502, 1512, 1522 were all prepared without post-lamination annealing (e.g., without performing block 508 of process 500). The second column of samples, including samples 1504, 1514, 1524 were all annealed at 245° C. after lamination (e.g., $T_2$=245° C. during block 508 of process 500). The third column of samples, including samples 1506, 1516, 1526 were all annealed at 250° C. after lamination (e.g., $T_2$=250° C. during block 508 of process 500). The fourth column of samples, including samples 1508, 1518, 1528 were all annealed at 275° C. after lamination (e.g., $T_2$=275° C. during block 508 of process 500). The fifth column of samples, including samples 1510, 1520, 1530 were all annealed at 290° C. after lamination (e.g., $T_2$=290° C. during block 508 of process 500).

As seen in FIG. 15, samples 1508, 1510, 1518, 1520, 1528, 1530, which were annealed at temperatures at or above 275° C., such as above 250° C., after lamination performed well in the delamination tests, with little or no delamination of the film apparent after the tests. The amount of delamination was substantially worse with no annealing or annealing temperatures at or below 250° C.

The blushing performance of the samples of set 1500 can be seen in FIG. 15 and/or quantified as follows on a scale of 1-10 with 10 being the best. Samples 1502, 1504, 1506, 1508, 1510 can have blushing values of 4, 4, 5, 1, and 1, respectively. Samples 1512, 1514, 1516, 1518, 1520 can have blushing values of 9, 9, 8, 1, and 1, respectively. Samples 1522, 1524, 1526, 1528, 130 can have blushing values of 4, 4, 6, 1, and 1, respectively. Of note, the blushing performance can be characterized by comparing the approximately lower two-thirds of each sample to a sample or portion of aluminum metal that either has not been exposed to any acid test or similar conditions, or has been exposed to a neutral bath (e.g., deionized water bath) under similar conditions (e.g., time and temperature) as the acid-tested samples. For example, while the difference in color between the top one-third and lower two-thirds of sample 1530 may be only slight, the blushing performance of sample 1530 may be characterized as a 1 when compared against an untreated piece of aluminum metal.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. While described with reference to moving metal strips in a continuous process line, aspects of the present disclosure may be usable on stationary metal blanks.

As used below, any reference to a series of examples is to be understood as a reference to each of those examples disjunctively (e.g., "Examples 1-4" is to be understood as "Examples 1, 2, 3, or 4").

Example 1 is a method for preparing can end stock, comprising: pre-heating a metal strip to a first temperature below 250° C.; laminating a polymer film to a first side of the metal strip to produce a laminated metal strip, wherein a main component of the polymer film has a melting temperature above the first temperature; and annealing the laminated metal strip at an annealing temperature, wherein the annealing temperature is higher than the melting temperature of the polymer film.

Example 2 is the method of example 1, wherein the metal strip is an aluminum strip.

Example 3 is the method of examples 1 or 2, wherein the metal strip is an AA5182 aluminum alloy.

Example 4 is the method of examples 1-3, further comprising applying a conversion coating to the metal strip, wherein laminating the polymer film to the first side of the metal strip includes laminating the polymer film to the conversion coating.

Example 5 is the method of examples 1-4, wherein laminating the polymer film includes laminating a polyethylene terephthalate film to the metal strip.

Example 6 is the method of examples 1-5, further comprising applying a layer of lacquer or another polymer film to a second side of the metal strip, wherein the first side of the metal strip corresponds to an interior-facing side of a can end formed from the metal strip, and wherein the second side of the metal strip corresponds an exterior-facing side of a can end formed from the metal strip.

Example 7 is the method of examples 1-6, wherein annealing the laminated metal strip includes raising the temperature of the polymer film for a duration sufficient to melt the polymer film into a surface texture of the metal strip.

Example 8 is the method of examples 1-7, wherein annealing the laminated metal strip includes raising the temperature of the polymer film to at least 250° C.

Example 9 is the method of examples 1-8, wherein annealing the laminated metal strip includes raising the temperature of the polymer film to at least 265° C.

Example 10 is the method of examples 1-9, wherein annealing the laminated metal strip includes raising the temperature of the polymer film to at least 280° C.

Example 11 is the method of examples 1-10, further comprising cooling the laminated metal strip after annealing the laminated metal strip to ensure that the polymer film remains amorphous.

Example 12 is the method of examples 1-11, further comprising applying a lubricant to the laminated metal strip after annealing the laminated metal strip.

Example 13 is the method of examples 1-12, further comprising: selecting a conversion layer parameter from a plurality of conversion layer parameter candidates based on tested performance; and applying a conversion layer to the metal strip, according to the conversion layer parameter, prior to laminating the polymer film to the first side of the metal strip.

Example 14 is the method of example 13, wherein the tested performance is blushing performance.

Example 15 is a method for determining a conversion layer parameter comprising: determining a plurality of conversion layer parameter candidates; preparing, for each of the plurality of conversion layer parameter candidates, a can end stock sample according to the method of examples 1-14; evaluating blushing performance for each of the can end stock samples; and selecting a conversion layer parameter from the plurality of conversion layer parameter candidates based on the evaluated blushing performance.

Example 16 is the method of examples 1-15, further comprising: adjusting a surface roughness of the metal strip prior to laminating the polymer film to the first side of the metal strip.

Example 17 is the method of example 16, wherein adjusting the surface roughness includes decreasing a height of the surface roughness to a value lower than a thickness of a contact layer of the polymer film.

Example 18 is the method of examples 1-17, wherein laminating the polymer film to the first side of the metal strip includes: compressing the polymer film against the first side of the metal strip using an applicator roller having a compressible layer surrounding a hollow metal core; and passing a fluid through the hollow metal core to control a temperature of the compressible layer.

Example 19 is the method of example 18, further comprising: preheating the compressible layer prior to laminating the polymer film to the first side of the metal strip.

Example 20 is the method of examples 18 or 19, wherein passing the fluid through the hollow metal core includes cooling the fluid to extract heat from an interior surface of the compressible layer to induce a thermal gradient between the interior surface of the compressible layer and an exterior surface of the compressible layer.

Example 21 is the method of example 20, wherein cooling the fluid includes reducing a temperature of the fluid sufficiently to maintain an interior temperature at the interior surface of the compressible layer below a maximum setpoint and an exterior temperature at the exterior surface of the compressible layer above a minimum setpoint.

Example 22 is the method of examples 18-21, further comprising: determining a temperature of the compressible layer; and adjusting a temperature or volumetric flow rate of the fluid based on the temperature of the compressible layer.

Example 23 is a can end stock product prepared according to the method of examples 1-22.

Example 24 is a beverage can comprising a body piece and an end cap, wherein the end cap is formed from can end stock prepared according to the method of examples 1-22.

Example 25 is a system, comprising: a pre-heating furnace for accepting a metal strip and pre-heating the metal strip to a pre-heating temperature; a lamination system positioned downstream of the pre-heating furnace for accepting the metal strip at the pre-heating temperature and applying a polymer film to a first side of the metal strip, wherein the pre-heating temperature is below a melting temperature of a main component of the polymer film; and an annealing furnace positioned downstream of the lamination system for accepting a laminated metal strip and heating the laminated metal strip to an annealing temperature, wherein the annealing temperature is greater than the melting temperature of the main component of the polymer film.

Example 26 is the system of example 25, wherein the metal strip is an aluminum strip.

Example 27 is the system of examples 25 or 26, wherein the metal strip is an AA5182 aluminum alloy.

Example 28 is the system of examples 25-27, further comprising a conversion coating application system for applying a conversion coating to the metal strip, wherein the lamination system is configured to apply the polymer film to the conversion coating.

Example 29 is the system of examples 25-28, wherein the lamination system is coupled to a supply of polyethylene terephthalate film.

Example 30 is the system of examples 25-29, further comprising a lacquer application system for applying a layer of lacquer to a second side of the metal strip.

Example 31 is the system of examples 25-30, wherein the lamination system is configured to apply an additional polymer film to a second side of the metal strip opposite the first side.

Example 32 is the system of examples 25-31, wherein the annealing furnace has a length sufficient to raise the temperature of the polymer film for a duration sufficient to melt the polymer film into a surface texture of the metal strip.

Example 33 is the system of examples 25-32, wherein the annealing furnace is configured to provide heat sufficient to raise the temperature of the polymer film to at least 250° C.

Example 34 is the system of examples 25-33, wherein the annealing furnace is configured to provide heat sufficient to raise the temperature of the polymer film to at least 265° C.

Example 35 is the system of examples 25-34, wherein the annealing furnace is configured to provide heat sufficient to raise the temperature of the polymer film to at least 280° C.

Example 36 is the system of examples 25-35, further comprising a conversion layer applicator for applying a conversion layer to the metal strip according to a conversion layer parameter selected from a plurality of conversion layer parameter candidates based on tested performance.

Example 37 is the system of examples 25-36, further comprising a surface roughness adjustor for adjusting a surface roughness of the metal strip, wherein the surface roughness adjustor is located upstream of the lamination system.

Example 38 is the system of example 37, wherein the surface roughness adjustor is configured to decrease a height of the surface roughness to a value lower than a thickness of a contact layer of the polymer film.

Example 39 is the system of examples 25-38, wherein the lamination system comprises: an applicator roller comprising a compressible layer surrounding a hollow metal core; and a coolant source for providing coolant to a passage of the hollow metal core to control a temperature of the compressible layer.

Example 40 is the system of example 39, further comprising: an external heater positioned adjacent the compressible layer to preheat the compressible layer.

Example 41 is the system of examples 39 of 40, wherein the lamination system further comprises a controller coupled to the coolant source for adjusting a volumetric flow rate or temperature of the coolant provided by the coolant source to maintain a temperature gradient across an interior surface of the compressible layer and an exterior surface of the compressible layer.

Example 42 is the system of example 41, wherein the lamination system further comprises a temperature sensor coupled to the controller for providing a temperature signal associated with a temperature of the compressible layer.

Example 43 is the system of examples 41 or 42, wherein the lamination system further comprises a data store containing a model, and wherein the controller is coupled to the data store to control the coolant source based on the model.

Example 44 is the system of examples 39-43, wherein the lamination system further comprises a controller coupled to the coolant source for adjusting a volumetric flow rate or temperature of the coolant provided by the coolant source to maintain an interior temperature of an interior surface of the compressible layer below a maximum setpoint and an exterior temperature of an exterior surface of the compressible layer above a minimum setpoint.

Example 45 is a method for laminating metal, comprising: compressing a polymer film against a first side of a pre-heated metal strip using an applicator roller having a compressible layer surrounding a hollow metal core; and passing a fluid through the hollow metal core to control a temperature of the compressible layer.

Example 46 is the method of example 45, further comprising: preheating the compressible layer prior to laminating the polymer film to the first side of the metal strip.

Example 47 is the method of example 46, wherein pre-heating the compressible layer includes passing heated fluid through the hollow metal core.

Example 48 is the method of examples 46 or 47, wherein preheating the compressible layer includes externally heating the compressible layer.

Example 49 is the method of examples 45-48, wherein passing the fluid through the hollow metal core includes cooling the fluid to extract heat from an interior surface of the compressible layer to induce a thermal gradient between the interior surface of the compressible layer and an exterior surface of the compressible layer.

Example 50 is the method of examples 45-49, wherein cooling the fluid includes reducing a temperature of the fluid sufficiently to maintain an interior temperature at the interior surface of the compressible layer below a maximum setpoint and an exterior temperature at the exterior surface of the compressible layer above a minimum setpoint.

Example 51 is the method of examples 45-50, further comprising: determining a temperature of the compressible layer; and adjusting a temperature or volumetric flow rate of the fluid based on the temperature of the compressible layer.

Example 52 is the method of example 51, wherein determining the temperature of the compressible layer comprises receiving a temperature measurement of the compressible layer from a temperature sensor.

Example 53 is the method of examples 51 or 52, wherein determining the temperature of the compressible layer comprises receiving a temperature measurement of an element near the compressible layer from a temperature sensor.

Example 54 is the method of examples 51-53, wherein determining the temperature of the compressible layer comprises accessing a model.

Example 55 is the method of examples 45-54, further comprising: sensing a change in line speed of the preheated metal strip; and adjusting a temperature or volumetric flow rate of the fluid based on the change in line speed.

What is claimed is:

1. A method for preparing can end stock, comprising:
   pre-heating a metal strip to a first temperature below 250° C.;
   laminating a polymer film to a first side of the metal strip to produce a laminated metal strip, wherein a main component of the polymer film has a melting temperature above the first temperature; and
   annealing the laminated metal strip at an annealing temperature of at least 250° C., wherein the annealing temperature is higher than the melting temperature of the polymer film;
   wherein annealing the laminated metal strip includes raising the temperature of the polymer film for a duration sufficient to melt the polymer film into a surface texture of the metal strip;
   wherein a height of a surface roughness of the metal strip is decreased to a value lower than a thickness of a contact layer of the polymer film prior to laminating the polymer film to the first side of the metal strip, and wherein the metal strip comprises aluminum.

2. The method of claim 1, wherein the metal strip is an AA5182 aluminum alloy.

3. The method of claim 1, further comprising applying a conversion coating to the metal strip, wherein laminating the polymer film to the first side of the metal strip includes laminating the polymer film to the conversion coating.

4. The method of claim 1, wherein laminating the polymer film includes laminating a polyethylene terephthalate film to the metal strip.

5. The method of claim 1, further comprising applying a layer of lacquer or another polymer film to a second side of the metal strip, wherein the first side of the metal strip corresponds to an interior-facing side of a can end formed from the metal strip, and wherein the second side of the metal strip corresponds an exterior-facing side of a can end formed from the metal strip.

6. The method of claim 1, wherein annealing the laminated metal strip includes raising the temperature of the polymer film to at least 265° C.

7. The method of claim 1, wherein annealing the laminated metal strip includes raising the temperature of the polymer film to at least 280° C.

8. The method of claim 1, further comprising cooling the laminated metal strip after annealing the laminated metal strip to ensure that the polymer film remains amorphous.

9. The method of claim 1, further comprising applying a lubricant to the laminated metal strip after annealing the laminated metal strip.

10. The method of claim 1, further comprising:
    selecting a conversion layer parameter from a plurality of conversion layer parameter candidates based on tested performance; and
    applying a conversion layer to the metal strip, according to the conversion layer parameter, prior to laminating the polymer film to the first side of the metal strip.

11. The method of claim 10, wherein the tested performance is blushing performance.

12. A method for determining a conversion layer parameter comprising:
    determining a plurality of conversion layer parameter candidates;
    preparing, for each of the plurality of conversion layer parameter candidates, a can end stock sample according to the method of claim 1;
    evaluating blushing performance for each of the can end stock samples; and
    selecting a conversion layer parameter from the plurality of conversion layer parameter candidates based on the evaluated blushing performance.

13. The method of claim 1, wherein adjusting the surface roughness includes decreasing a height of the surface roughness to a value lower than a thickness of a contact layer of the polymer film.

14. The method of claim 1, wherein laminating the polymer film to the first side of the metal strip includes:
    compressing the polymer film against the first side of the metal strip using an applicator roller having a compressible layer surrounding a hollow metal core; and
    passing a fluid through the hollow metal core to control a temperature of the compressible layer.

15. The method of claim 14, further comprising:
    preheating the compressible layer prior to laminating the polymer film to the first side of the metal strip.

16. The method of claim 14, wherein passing the fluid through the hollow metal core includes cooling the fluid to extract heat from an interior surface of the compressible layer to induce a thermal gradient between the interior surface of the compressible layer and an exterior surface of the compressible layer.

17. The method of claim 16, wherein cooling the fluid includes reducing a temperature of the fluid sufficiently to maintain an interior temperature at the interior surface of the compressible layer below a maximum setpoint and an exterior temperature at the exterior surface of the compressible layer above a minimum setpoint.

18. The method of claim 14, further comprising:
determining a temperature of the compressible layer; and
adjusting a temperature or volumetric flow rate of the fluid based on the temperature of the compressible layer.

19. A can end stock product prepared according to the method of claim 1.

20. A beverage can comprising a body piece and an end cap, wherein the end cap is formed from can end stock prepared according to the method of claim 1.

21. A method for laminating metal, comprising:
decreasing a height of a surface roughness of a first side of a metal strip to a value lower than a thickness of a contact layer of a polymer film;
preheating the metal strip;
compressing the polymer film against the first side of the preheated metal strip using an applicator roller having a compressible layer surrounding a hollow metal core, wherein the compression is for a duration sufficient to melt the polymer film into the adjusted surface roughness of the metal strip; and
passing a fluid through the hollow metal core to control a temperature of the compressible layer; and wherein the metal strip comprises aluminum.

22. The method of claim 21, further comprising:
preheating the compressible layer prior to laminating the polymer film to the first side of the metal strip.

23. The method of claim 22, wherein preheating the compressible layer includes passing heated fluid through the hollow metal core.

24. The method of claim 22, wherein preheating the compressible layer includes externally heating the compressible layer.

25. The method of claim 21, wherein passing the fluid through the hollow metal core includes cooling the fluid to extract heat from an interior surface of the compressible layer to induce a thermal gradient between the interior surface of the compressible layer and an exterior surface of the compressible layer.

26. The method of claim 25, wherein cooling the fluid includes reducing a temperature of the fluid sufficiently to maintain an interior temperature at the interior surface of the compressible layer below a maximum setpoint and an exterior temperature at the exterior surface of the compressible layer above a minimum setpoint.

27. The method of claim 21, further comprising:
determining a temperature of the compressible layer; and
adjusting a temperature or volumetric flow rate of the fluid based on the temperature of the compressible layer.

28. The method of claim 27, wherein determining the temperature of the compressible layer comprises receiving a temperature measurement of the compressible layer from a temperature sensor.

29. The method of claim 27, wherein determining the temperature of the compressible layer comprises receiving a temperature measurement of an element near the compressible layer from a temperature sensor.

30. The method of claim 27, wherein determining the temperature of the compressible layer comprises accessing a model.

31. The method of claim 21, further comprising:
sensing a change in line speed of the preheated metal strip; and
adjusting a temperature or volumetric flow rate of the fluid based on the change in line speed.

32. The method of claim 1, wherein a surface roughness of the metal strip is adjusted comprises increasing the surface roughness of the metal strip.

* * * * *